(12) United States Patent
Howick et al.

(10) Patent No.: US 9,315,133 B2
(45) Date of Patent: *Apr. 19, 2016

(54) HEATER FOR AN AUTOMOTIVE VEHICLE AND METHOD OF FORMING SAME

(71) Applicant: GENTHERM GMBH, Odelzhausen (DE)

(72) Inventors: Shaun Calvin Howick, LaSalle (CA); Goran Bajic, Windsor (CA)

(73) Assignee: GENTHERM GMBH, Odelzhausen (DE)

( * ) Notice: Subject to any disclaimer, the term of this patent is extended or adjusted under 35 U.S.C. 154(b) by 8 days.

This patent is subject to a terminal disclaimer.

(21) Appl. No.: 14/310,072

(22) Filed: Jun. 20, 2014

(65) Prior Publication Data

US 2014/0299591 A1 Oct. 9, 2014

Related U.S. Application Data

(60) Continuation of application No. 13/940,973, filed on Jul. 12, 2013, now Pat. No. 8,766,142, which is a continuation of application No. 12/778,238, filed on May 12, 2010, now Pat. No. 8,507,831, which is a (Continued)

(51) Int. Cl.
*H05B 1/00* (2006.01)
*B60N 2/56* (2006.01)
(Continued)

(52) U.S. Cl.
CPC .............. *B60N 2/5685* (2013.01); *B60N 2/002* (2013.01); *B60N 2/5678* (2013.01);
(Continued)

(58) Field of Classification Search
CPC .............. H05B 3/00; B60L 1/02; A47C 7/74
USPC ......... 219/217, 212, 202, 211, 203, 219, 210, 219/529, 549, 543, 544, 545, 552, 528, 548, 219/345; 297/219.2, 225, 229, 228.1, 297/228.13
See application file for complete search history.

(56) References Cited

U.S. PATENT DOCUMENTS

| 1,475,912 | A | 11/1923 | Williams |
| 2,473,183 | A | 6/1949 | Watson |

(Continued)

FOREIGN PATENT DOCUMENTS

| CA | 2489565 C | 12/2003 |
| DE | 3513909 | 10/1986 |

(Continued)

OTHER PUBLICATIONS

International Search Report and Written Opinion, Application No. PCTIUS2011/036202, dated Aug. 17, 2011.

(Continued)

*Primary Examiner* — Phuong Nguyen
(74) *Attorney, Agent, or Firm* — The Dobrusin Law Firm, P.C.

(57) ABSTRACT

There is disclosed a heater for an automotive vehicle or other article of manufacture. The heater typically includes a first conductive medium and a second conductive medium disposed upon a carrier. In a preferred embodiment, the first conductive medium includes a first section and a second section that are electrically connected by a second conductive medium. The second conductive medium preferably exhibits a positive thermal coefficient.

20 Claims, 6 Drawing Sheets

Related U.S. Application Data continuation of application No. 11/923,091, filed on Oct. 24, 2007, now Pat. No. 7,741,582, which is a division of application No. 10/715,160, filed on Nov. 17, 2003, now Pat. No. 7,306,283.

(60) Provisional application No. 60/474,835, filed on May 30, 2003, provisional application No. 60/428,002, filed on Nov. 21, 2002.

(51) Int. Cl.
| | | |
|---|---|---|
| H05B 3/34 | (2006.01) | |
| H05B 3/84 | (2006.01) | |
| B60N 2/00 | (2006.01) | |
| H05B 1/02 | (2006.01) | |

(52) U.S. Cl.
 CPC ............. *H05B 1/0238* (2013.01); *H05B 3/34* (2013.01); *H05B 3/845* (2013.01); *H05B 2203/003* (2013.01); *H05B 2203/004* (2013.01); *H05B 2203/005* (2013.01); *H05B 2203/006* (2013.01); *H05B 2203/011* (2013.01); *H05B 2203/013* (2013.01); *H05B 2203/016* (2013.01); *H05B 2203/017* (2013.01); *H05B 2203/02* (2013.01); *H05B 2203/026* (2013.01); *H05B 2203/029* (2013.01)

(56) References Cited

U.S. PATENT DOCUMENTS

| | | |
|---|---|---|
| 2,978,972 A | 4/1961 | Hake |
| 3,287,684 A | 11/1966 | Armbruster |
| 3,400,254 A | 9/1968 | Takemori |
| 3,448,246 A | 6/1969 | Armbruster |
| 3,558,858 A | 1/1971 | Luger |
| 3,721,799 A | 3/1973 | Carlstrom |
| 3,877,788 A | 4/1975 | Sprague |
| 3,892,946 A | 7/1975 | Rimmi |
| 4,032,752 A | 6/1977 | Ohmura |
| 4,044,221 A | 8/1977 | Kulhn |
| 4,149,066 A | 4/1979 | Niibe |
| 4,245,149 A | 1/1981 | Fairlie |
| 4,335,725 A | 6/1982 | Geldmacher |
| 4,399,347 A | 8/1983 | Schmitt |
| 4,410,790 A | 10/1983 | Berg et al. |
| 4,436,986 A | 3/1984 | Carlson |
| 4,523,085 A | 6/1985 | Grise |
| 4,533,821 A | 8/1985 | Sato |
| 4,539,051 A | 9/1985 | Hacias |
| 4,542,285 A | 9/1985 | Grise |
| 4,626,664 A | 12/1986 | Grise |
| 4,628,187 A | 12/1986 | Sekiguchi et al. |
| 4,633,068 A | 12/1986 | Grise |
| 4,656,339 A | 4/1987 | Grise |
| 4,661,689 A | 4/1987 | Harrison |
| 4,665,304 A | 5/1987 | Spencer |
| 4,713,531 A | 12/1987 | Fennekels et al. |
| 4,719,335 A | 1/1988 | Batliwalla et al. |
| 4,722,853 A | 2/1988 | Batliwalla et al. |
| 4,725,717 A | 2/1988 | Harrison |
| 4,743,741 A | 5/1988 | Ramus |
| 4,752,672 A | 6/1988 | Grise |
| 4,761,541 A | 8/1988 | Batliwalla et al. |
| 4,777,351 A | 10/1988 | Batliwalla et al. |
| 4,845,343 A | 7/1989 | Aune et al. |
| 4,849,255 A | 7/1989 | Grise et al. |
| 4,857,711 A | 8/1989 | Watts |
| 4,868,898 A | 9/1989 | Seto |
| 4,888,089 A | 12/1989 | Marstiller |
| 4,892,998 A | 1/1990 | Marstiller et al. |
| 4,912,306 A | 3/1990 | Grise et al. |
| 4,923,248 A | 5/1990 | Feher |
| 4,931,627 A | 6/1990 | Watts |
| 4,964,674 A | 10/1990 | Altmann et al. |
| 5,015,824 A | 5/1991 | Monter et al. |
| 5,019,797 A | 5/1991 | Marstiller et al. |
| 5,025,136 A | 6/1991 | Doege et al. |
| 5,034,594 A | 7/1991 | Beezhold et al. |
| 5,038,018 A | 8/1991 | Grise et al. |
| 5,045,673 A | 9/1991 | Kelly |
| 5,057,674 A | 10/1991 | Smith-Johannsen |
| 5,081,339 A | 1/1992 | Stine |
| 5,111,025 A | 5/1992 | Barma et al. |
| 5,132,840 A | 7/1992 | Okada et al. |
| 5,155,334 A | 10/1992 | Marstiller et al. |
| 5,181,006 A | 1/1993 | Shafe et al. |
| 5,187,350 A | 2/1993 | Tsuchiya |
| 5,197,595 A | 3/1993 | Coultas |
| 5,198,639 A | 3/1993 | Smuckler |
| 5,206,482 A | 4/1993 | Smuckler |
| 5,335,381 A | 8/1994 | Chang |
| 5,344,591 A | 9/1994 | Smuckler |
| 5,354,966 A | 10/1994 | Sperbeck |
| 5,405,178 A | 4/1995 | Weingartner et al. |
| 5,414,241 A | 5/1995 | Osbashi et al. |
| 5,418,025 A | 5/1995 | Harmand et al. |
| 5,422,462 A | 6/1995 | Kishimoto |
| 5,432,322 A | 7/1995 | Ingram et al. |
| 5,440,425 A | 8/1995 | Kadooka et al. |
| 5,451,747 A | 9/1995 | Sullivan et al. |
| 5,477,033 A | 12/1995 | Bergholtz |
| 5,516,189 A | 5/1996 | Ligeras |
| 5,543,601 A | 8/1996 | Bartrug et al. |
| 5,626,021 A | 5/1997 | Karunasiri et al. |
| 5,643,480 A | 7/1997 | Gustavsson et al. |
| 5,677,662 A | 10/1997 | Bresolin et al. |
| 5,679,277 A | 10/1997 | Niibe et al. |
| 5,702,565 A | 12/1997 | Wu et al. |
| 5,716,536 A | 2/1998 | Yoikoto et al. |
| 5,796,044 A | 8/1998 | Cobian et al. |
| 5,800,483 A | 9/1998 | Vought |
| 5,800,595 A | 9/1998 | Wright |
| 5,801,914 A | 9/1998 | Thrash |
| 5,824,993 A | 10/1998 | Chrysochoos et al. |
| 5,824,994 A | 10/1998 | Noda et al. |
| 5,824,996 A | 10/1998 | Kochman et al. |
| 5,851,588 A | 12/1998 | Uthoff, Jr. |
| 5,861,610 A | 1/1999 | Weiss |
| 5,897,162 A | 4/1999 | Humes et al. |
| 5,902,505 A | 5/1999 | Finley |
| 5,904,874 A | 5/1999 | Winter |
| 5,921,314 A | 7/1999 | Schuller et al. |
| 5,948,297 A | 9/1999 | Haubner et al. |
| 5,961,869 A | 10/1999 | Irgens |
| 5,990,449 A | 11/1999 | Sugiyama et al. |
| 6,031,214 A | 2/2000 | Bost et al. |
| 6,054,690 A | 4/2000 | Petit et al. |
| 6,057,530 A | 5/2000 | Gurevich |
| 6,064,037 A | 5/2000 | Weiss et al. |
| 6,070,115 A | 5/2000 | Oestreicher et al. |
| 6,084,217 A | 7/2000 | Bulgajewski |
| 6,093,910 A | 7/2000 | McClintock et al. |
| 6,097,009 A | 8/2000 | Cole |
| 6,111,234 A | 8/2000 | Batliwalla et al. |
| 6,124,577 A | 9/2000 | Fristedt |
| 6,143,206 A | 11/2000 | Handa et al. |
| 6,147,332 A | 11/2000 | Holmberg et al. |
| 6,150,642 A | 11/2000 | Weiss et al. |
| 6,164,719 A | 12/2000 | Raub |
| 6,172,344 B1 | 1/2001 | Gordon et al. |
| 6,179,378 B1 | 1/2001 | Baumgartner et al. |
| 6,189,487 B1 | 2/2001 | Owen et al. |
| 6,194,687 B1 * | 2/2001 | Joseph et al. .................. 219/217 |
| 6,194,692 B1 | 2/2001 | Oberle |
| 6,215,111 B1 | 4/2001 | Rock et al. |
| 6,220,659 B1 | 4/2001 | McDowell et al. |
| 6,229,123 B1 | 5/2001 | Kochman et al. |
| 6,278,090 B1 | 8/2001 | Fristedt et al. |
| 6,294,758 B1 | 9/2001 | Masao et al. |
| 6,307,188 B1 | 10/2001 | Bulgajewski |

(56) References Cited

U.S. PATENT DOCUMENTS

| | | |
|---|---|---|
| 6,353,207 B1 | 3/2002 | Burt |
| 6,369,369 B2 | 4/2002 | Kichman et al. |
| 6,375,247 B1 | 4/2002 | Volz et al. |
| 6,378,948 B1 | 4/2002 | Macher et al. |
| 6,392,195 B1 | 5/2002 | Zhao et al. |
| 6,415,501 B1 | 7/2002 | Schlesselman |
| 6,426,485 B1 | 7/2002 | Bulgajewski et al. |
| 6,433,317 B1 | 8/2002 | Arx et al. |
| 6,439,658 B1 | 8/2002 | Ganz et al. |
| 6,452,138 B1 | 9/2002 | Kochman et al. |
| 6,455,823 B1 | 9/2002 | Bulgajewski et al. |
| 6,495,799 B1 | 12/2002 | Pillsbury et al. |
| 6,495,809 B2 | 12/2002 | Bulgajewski et al. |
| 6,501,055 B2 | 12/2002 | Rock et al. |
| 6,512,203 B2 | 1/2003 | Jones et al. |
| 6,541,737 B1 | 4/2003 | Eksim et al. |
| 6,559,422 B2 | 5/2003 | Burt |
| RE38,128 E | 6/2003 | Gallup et al. |
| 6,619,736 B2 | 9/2003 | Stowe et al. |
| 6,629,724 B2 | 10/2003 | Ekern et al. |
| 6,629,725 B1 | 10/2003 | Kunkel et al. |
| 6,661,341 B2 | 12/2003 | Masuda et al. |
| 6,664,512 B2 | 12/2003 | Horey et al. |
| 6,664,518 B2 | 12/2003 | Fristedt et al. |
| 6,676,207 B2 | 1/2004 | Rauh et al. |
| 6,686,562 B1 | 2/2004 | Weiss et al. |
| 6,710,303 B1 | 3/2004 | Lorenzen |
| 6,713,733 B2 | 3/2004 | Kochman et al. |
| 6,733,072 B2 | 5/2004 | Jaillet et al. |
| 6,838,647 B2 | 1/2005 | Nagele |
| 6,840,576 B2 | 1/2005 | Ekern et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,872,882 B2 | 3/2005 | Fritz |
| 6,884,965 B2 | 4/2005 | Nelson |
| 6,892,807 B2 | 5/2005 | Fristedt et al. |
| 6,893,086 B2 | 5/2005 | Bajic et al. |
| 6,906,293 B2 | 6/2005 | Schmiz et al. |
| 6,976,734 B2 | 12/2005 | Stoewe |
| 6,988,770 B2 | 1/2006 | Witchie |
| 7,036,283 B2 | 5/2006 | Halas |
| 7,040,710 B2 | 5/2006 | White et al. |
| 7,052,091 B2 | 5/2006 | Bajic et al. |
| 7,053,344 B1 | 5/2006 | Surjan et al. |
| 7,083,227 B2 | 8/2006 | Brennan et al. |
| 7,100,978 B2 | 9/2006 | Ekern et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,202,444 B2 | 4/2007 | Bulgajewski |
| 7,205,505 B2 | 4/2007 | Diemer et al. |
| 7,205,510 B2 | 4/2007 | Howick |
| 7,213,876 B2 | 5/2007 | Stoewe |
| 7,223,948 B2 | 5/2007 | Howick et al. |
| 7,229,129 B2 | 6/2007 | White et al. |
| 7,285,748 B2 | 10/2007 | Nelson et al. |
| 7,301,441 B2 | 11/2007 | Inada et al. |
| 7,306,283 B2 | 12/2007 | Howick et al. |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,461,892 B2 | 12/2008 | Bajic et al. |
| 7,475,938 B2 | 1/2009 | Stoewe et al. |
| 7,478,869 B2 | 1/2009 | Lazanja et al. |
| 7,506,938 B2 | 3/2009 | Brennan et al. |
| 7,510,239 B2 | 3/2009 | Stowe |
| 7,560,670 B2 | 7/2009 | Lorenzen et al. |
| 7,587,901 B2 | 9/2009 | Petrovski |
| 7,618,089 B2 | 11/2009 | Stoewe et al. |
| 7,637,569 B2 | 12/2009 | Krobok et al. |
| 7,741,582 B2 | 6/2010 | Howick et al. |
| 8,507,831 B2 | 8/2013 | Howick et al. |
| 2001/0002669 A1 | 6/2001 | Kochman et al. |
| 2001/0045733 A1 | 11/2001 | Stanley et al. |
| 2002/0000742 A1 | 1/2002 | Wato et al. |
| 2002/0018874 A1 | 2/2002 | Nakamura et al. |
| 2002/0056709 A1 | 5/2002 | Burt |
| 2002/0067058 A1 | 6/2002 | Pfahler |
| 2002/0067064 A1 | 6/2002 | Jaillet et al. |
| 2002/0117495 A1 | 8/2002 | Kochman et al. |
| 2003/0102296 A1 | 6/2003 | Nelson et al. |
| 2003/0189362 A1 | 10/2003 | Lichtinger et al. |
| 2004/0100131 A1 | 5/2004 | Howick et al. |
| 2004/0226939 A1 | 11/2004 | Winter et al. |
| 2004/0238516 A1 | 12/2004 | Bulgajewski |
| 2005/0077774 A1 | 4/2005 | Schwarz et al. |
| 2005/0093346 A1 | 5/2005 | Witchie |
| 2005/0166377 A1 | 8/2005 | Orlewski et al. |
| 2005/0173414 A1 | 8/2005 | Ishi et al. |
| 2005/0242081 A1 | 11/2005 | Howick |
| 2006/0015801 A1 | 1/2006 | Suh et al. |
| 2006/0103183 A1 | 5/2006 | White et al. |
| 2006/0138810 A1 | 6/2006 | Knoll et al. |
| 2006/0192417 A1 | 8/2006 | Ellinger et al. |
| 2007/0029768 A1 | 2/2007 | Clos et al. |
| 2007/0176471 A1 | 8/2007 | Knoll |
| 2007/0215601 A1 | 9/2007 | Frank |
| 2007/0290532 A1 | 12/2007 | Frank |
| 2009/0218855 A1 | 9/2009 | Wolas |
| 2010/0038356 A1 | 2/2010 | Fukuda et al. |
| 2010/0038357 A1 | 2/2010 | Fukuda et al. |
| 2010/0219664 A1 | 9/2010 | Howick et al. |
| 2010/0326976 A1 | 12/2010 | Nakajima et al. |

FOREIGN PATENT DOCUMENTS

| | | |
|---|---|---|
| DE | 3938951 C1 | 5/1990 |
| DE | 199 20 451 | 12/1999 |
| DE | 10027173 A1 | 12/2001 |
| EP | 0202896 A2 | 11/1986 |
| EP | 0582734 A1 | 2/1994 |
| EP | 0356087 B1 | 9/1994 |
| EP | 1001655 A2 | 5/2000 |
| EP | 1132028 A1 | 9/2001 |
| GB | 2010650 A | 6/1979 |
| JP | 56-93284 A | 7/1981 |
| JP | 57134655 A | 8/1982 |
| JP | 62109385 U | 5/1987 |
| JP | H06-132069 A | 5/1994 |
| JP | H6-333666 | 12/1994 |
| JP | 11218336 A | 8/1999 |
| JP | 11244093 A | 9/1999 |
| JP | 2000333781 A | 12/2000 |
| JP | 2001-93656 A | 4/2001 |
| JP | 2001237104 | 8/2001 |
| JP | 2001326105 | 11/2001 |
| JP | 2002050459 A | 2/2002 |
| JP | 2002-270350 A | 9/2002 |
| JP | 2002270403 | 9/2002 |
| JP | 2003109804 | 4/2003 |
| JP | 2003217902 | 7/2003 |
| JP | 2003217903 | 7/2003 |
| JP | 2003217904 | 7/2003 |
| JP | 2004055219 A | 2/2004 |
| JP | 2006-054131 A | 2/2006 |
| JP | 2006-324182 A | 11/2006 |
| JP | 2007-052945 A | 3/2007 |
| JP | 2007-227830 A | 9/2007 |
| JP | 2008-238926 A | 10/2008 |
| JP | 4349285 B2 | 10/2009 |
| WO | 89/06480 A1 | 7/1989 |
| WO | 94/09684 A1 | 5/1994 |
| WO | 97/01549 A1 | 1/1997 |
| WO | 00/10177 | 2/2000 |
| WO | 0043225 | 7/2000 |
| WO | 02/06914 A1 | 1/2002 |
| WO | 02/32188 A2 | 4/2002 |
| WO | 03/101777 | 12/2003 |

(56) References Cited

FOREIGN PATENT DOCUMENTS

| WO | 04001775 A1 | 12/2003 |
|---|---|---|
| WO | 2005/047056 | 5/2005 |
| WO | 2010065411 A1 | 6/2010 |

OTHER PUBLICATIONS

Automotive Heated Seats—Heated Steering Wheels, IGB Automotive Ltd., received by Assignee W.E.T. Automotive Systems, May 2003.
Automotive Seat Heating Systems, Bauerhin International, received by Assignee W.E.T. Automotive Systems, May 2002.
GMT 830 Heating & Ventilation System, IGB Automotive Ltd., received by Assignee W.E.T. Automotive Systems, Jun. 2003.
Co-pending National Phase U.S. Appl. No. 13/256,318, filed Sep. 13, 2011, (PCT Patent Application No. PCT/US2011/036202).
Co-pending U.S. Appl. No. 13/106,148, filed May 12, 2011.
Co-pending Design U.S. Appl. No. 29/402,183, filed Sep. 21, 2011.
Co-pending Design U.S. Appl. No. 29/402,182, filed Sep. 21, 2011.
Co-pending U.S. Appl. No. 61/537,361, filed Sep. 21, 2011.
5000 Silver Conductor, DuPont Microcircuit Materials, Apr. 2008, http://www.mcm.dupont.com.
5064 DuPont Silver Conductor, Technical Data Sheet, Mar. 2011, http://mcm.dupont.com.
7282 PCT Carbon Resistor, Tbieb Film Composition, Apr. 2005, http://www.dupont.com/mcm.
CCI-300 Data Sheet, Cabot Conductive Ink, Cabot Printed Electronic Materials, Jul. 12, 2007, www.cabot-corp.com.
International Search Report dated Apr. 15, 2004 for International Application No. PCT/EP03/13079.
Japanese Office Action, Application No. 2004-57284, dated Jan. 23, 2008.
Japanese Office Action, Application No. 2004-570284, date Jul. 11, 2007.
Chinese Office Action, Application No. 200380103828.X, dated Apr. 15, 2008.
German Office Action, Application No. 10393784.6, dated Jul. 18, 2006.

* cited by examiner

HEATER FOR AN AUTOMOTIVE VEHICLE AND METHOD OF FORMING SAME

CLAIM OF PRIORITY

To the extent applicable, the present invention claims the benefit of the priority of U.S. Provisional Application Ser. No. 60/428,002, filed Nov. 21, 2002 and U.S. Provisional Application Ser. No. 60/474,835, filed May 30, 2003, both of which are incorporated herein by reference for all purposes.

FIELD OF THE INVENTION

The present invention relates generally to heaters and more particularly to heaters for use in seats, mirrors, handles or other locations of automotive vehicles, transportation vehicles or other articles of manufacture.

BACKGROUND OF THE INVENTION

For many years, industry has been concerned with designing improved heaters for articles of manufacture such as seats, mirrors or handles of furniture, automotive vehicles or other transportation vehicles. Examples of such heaters are disclosed in U.S. Pat. Nos. 6,084,217, 5,451,747, 5,045,673, 4,931,627 and 4,857,711 all of which are expressly incorporated herein by reference for all purposes. However, the heaters disclosed in these patents suffer from drawbacks. For example, and without limitation, U.S. Pat. No. 6,084,217 employs a "polymeric thick film" and drawbacks with the implementation of such technology have shown that heaters employing such films have been relatively inflexible, resulting in the potential for noise resulting from body shifting upon a seating surface. Also, these heaters have traditionally offered only one heat output level when in use. In the interest of improving upon existing technology in this field, the present invention provides a heater that is particularly suitable for use in seats of automotive vehicles, but which may be adapted for application in other transportation vehicles or other articles of manufacture as well.

SUMMARY OF THE INVENTION

According to one aspect of the invention, there is disclosed a heater and a method of forming the same. For forming the heater, a flexible carrier is provided. The carrier is preferably formed of a material selected from the group consisting of polymeric materials and fabric materials. The carrier also preferably includes a first lengthwise edge opposite a second lengthwise edge wherein both the first and second lengthwise edge having an indentation with at least one contour. A first conductive medium is typically disposed upon the carrier. The first conductive medium is preferably formed of a polymeric material and preferably includes the following: i) a negative section having a first base portion and a plurality of first extensions extending from the first base portion, the first base portion extending along the first lengthwise edge of the carrier along the at least one contour of the first lengthwise edge; and ii) a positive section having a second base portion and a plurality of second extensions extending from the second base portion, the second base portion extending along the second lengthwise edge of the carrier along the at least one contour of the second lengthwise edge. A second conductive medium is also preferably disposed upon the carrier. The second conductive medium typically includes a plurality of strips wherein each of the strips is in overlapping relation with at least one of the plurality of first extensions and at least one of the plurality of second extensions. Typically, the second conductive medium has positive thermal coefficient characteristics.

According to another aspect of the present invention, the first conductive medium includes at least a first section, a second section and a third section, wherein the sections are spaced apart. Optionally, each section may comprise one or more extensions or combinations. A second conductive medium is also disposed upon the carrier and is interposed between the spaced sections (e.g. between the extensions of the sections). As with the previous aspect of the invention, the second conductive medium typically has positive thermal coefficient characteristics.

According to yet another preferred aspect of the invention the heater of the present invention is integrated into an article of manufacture. As an example, the heater may be integrated into a seat of an automotive vehicle. The seat typically includes a foam cushion for a support component of the vehicle seat and the foam cushion preferably includes a cavity formed therein. A trim layer will typically substantially cover the foam cushion. The heater preferably disposed between the foam cushion and the trim layer. In a preferred embodiment, at least a portion of the heater extends into the cavity of the foam cushion thereby curving the at least one contour of the first base portion of the first conductive medium and the at least one contour of the second base portion or the first conductive medium.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

Figure 1:
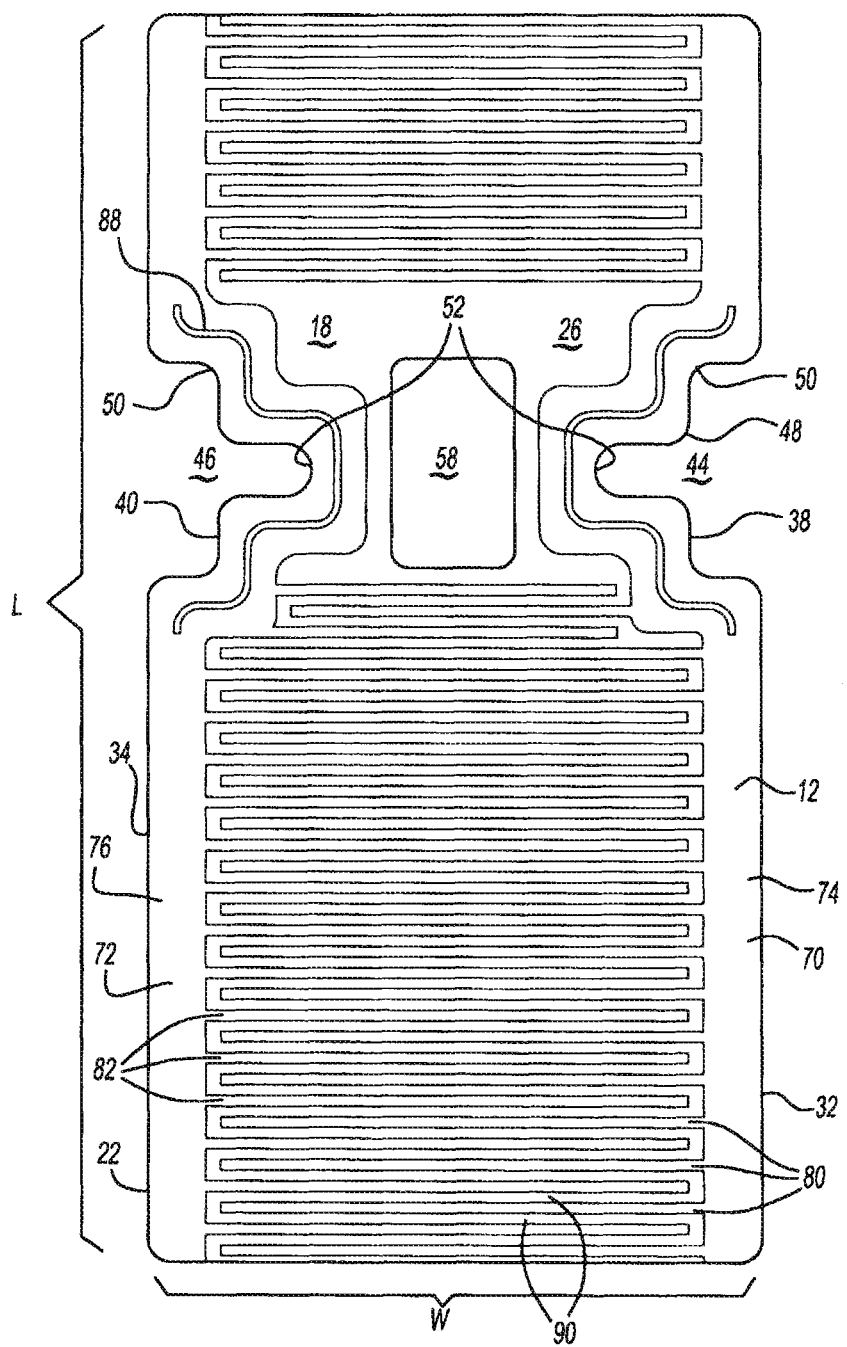
FIG. 1 is a top view of an exemplary partially formed heater in accordance with an exemplary aspect of the present invention.

The present invention is predicated upon providing an improved heater suitable for integration into a variety of articles of manufacture. For example, the heater may be integrated into or attached to carriers (e.g., members, structures, panels, floors, walls or the like) of various articles of manufacture such as buildings, furniture, transportation vehicles (e.g., boats, trains, airplanes, busses) or the like. Alternatively, the heater may be integrated into or attached to various components of transportation vehicles such as seats, mirrors or mirror assemblies (e.g. rearview mirrors, side view mirrors or the like), gear shifters, panels, footwells, floor mats, cargo or bed liners, windows or other components. The heater is particularly suitable for integration into a seat of an automotive vehicle. More particularly, the heater is suitable of integration with the seat portion, back portion, head rest portion, or a combination thereof.

In another automotive application, the present invention may be used in a steering assembly. As such, the heater may be placed on or integrated with various regions of a steering wheel including the hub, wheel, spokes, turn signal or shifter of the steering wheel assembly. Likewise, the heater of the present invention may be located anywhere throughout the vehicle, and most advantageously, with components that generally come in contact with an occupant of the vehicle including arm rest, rear view mirrors, user control interfaces and otherwise.

Outside of the automotive application, it is foreseeable that the present invention may be incorporated into other applications including Bed mattresses, wheel chairs, articles of clothing, or any other object that may come into contact with a person.

Furthermore, the present invention may be used outside of personal comfort applications including: infrared sensing technology, heating electrical or mechanical components or even heating a fluid through a submersion of the heater or an application to the outer walls of a container. Also, the heater may include or be integrated with: an antenna for reception or transmission of radio frequencies; a sensor such as a seat occupant sensor (e.g. for use with an airbag or otherwise), or a sensor for children car seats; a warning device for signaling an alarm when a temperature (internal or otherwise) of the vehicle is undesirably high or low; combinations thereof or the like. In some or all of the previous applications, the heater may be configured with a pressure sensor to determine the presence of an applied force acting on the heater or the sensor.

The heater of the present invention may exhibit one or more advantages as compared to previous heaters. As one example, the heater may control its heat output without employing components such as a controller, a thermostat, a temperature sensor, combinations thereof or the like. Of course, it is contemplated that these components may be included with the heater to assist in controlling or regulating the amount of heat output by the heater. As another advantage, the geometry, sizing, materials and configuration of the heater and its components can assist in forming a more effective heating system within a vehicle seat or other article of manufacture. As an example, a preferred heater may be formed of materials that add flexibility to the heater for assisting in minimizing noise that might otherwise be produced by the heater. As another example, a preferred heater may include one or more contours, openings or cavities for aiding the bending of the heater thereby allowing the heater to conform to contours of an article of manufacture particularly for assisting in attaching the heater to the article.

In one or more alternate embodiments, the heater of the present invention may also be adapted to selectively activate one or more regions of the heater to provide selective heating, to manipulate the heat output generated by the heater or both. In the one or more alternate embodiments, a user can preferably control one or both of the location and intensity of heat provided by the heater of the present invention.

Generally, the heater of the present invention will include one or a combination of the following components:
1) a carrier that is preferably configured as a flexible panel;
2) a first conductive medium disposed upon the carrier, the first conductive medium preferably including a first section and a second section wherein each section preferably includes a base portion and a plurality of extensions extending from the base portion;
3) a second conductive medium for interconnecting the first section to the second section, the second conductive medium preferably including a plurality of resistive strips, which preferably interconnect the plurality of extensions of the first section to the plurality of extensions of the second section wherein the second conductive medium preferably exhibits positive thermal coefficient characteristics.

Optionally, the first conductive medium can include a third section for assisting the heater in providing multiple heat output levels or for allowing selective heating of different locations of the heater.

Figure 2:
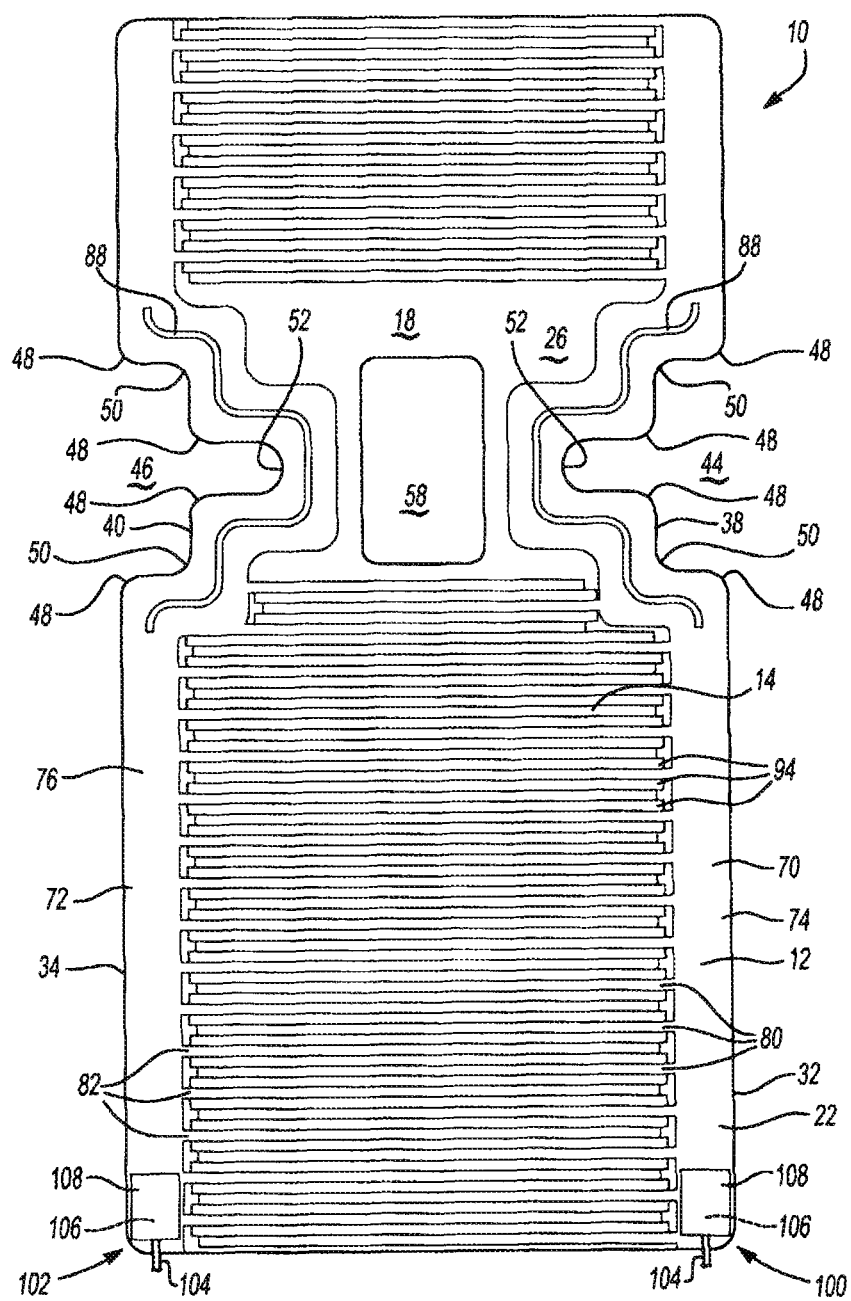
FIG. 2 is a top view of the exemplary heater in FIG. 1 after further formation of the heater in accordance with an exemplary aspect of the present invention.
Figure 3:
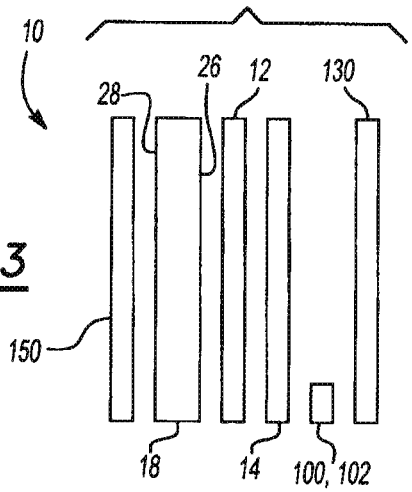
FIG. 3 is a blown up side cross-sectional view of the exemplary heater of FIGS. 1 and 2 with additional exemplary components in accordance with an exemplary aspect of the present invention.

Referring to FIGS. 1, 2 and 3, there is illustrated the formation of an exemplary heater 10 in accordance with the present invention. The heater 10 includes a first conductive medium 12 and a second conductive medium 14 disposed upon a carrier 18. Generally, the heater 10 is configured as a flexible panel (i.e., with opposing surfaces and a thickness therebetween) although other shapes or configurations may be employed as well.

For example, while in one embodiment the carrier 18 may be flexible, it is foreseeable that the carrier may alternatively be rigid or semi-rigid or non existent altogether (discussed in greater detail below). Regardless of the rigidity characteristics of the carrier 18, the carrier may be formed in numerous shapes and configuration as desired depending on the application (e.g. seat, seat back, head rest, mirror, steering wheel, or any other article that may be heated to enhance the environment for a user). Moreover, the carrier may include contours for assisting in stress relief particularly when the heater may be subject to stresses from pressure, movement or otherwise.

The carrier 18, as illustrated, is configured as panel with opposing surfaces 26, 28. As seen in the particular embodiment of FIGS. 1, 2 and 5, the carrier 18 is substantially elongated and generally rectangular and more preferably is hourglass shaped. As shown, the carrier 18 has a length (L) and a width (W) and includes an outer peripheral edge 22 extending substantially continuously about the carrier 18 substantially defining the shape of the carrier 18. The peripheral edge 22 is shown to include a first lengthwise edge 32 opposing a second lengthwise edge 34.

In the particular embodiment illustrated, the first lengthwise edge 32 and the second lengthwise edge 34 have cutouts for helping to form the hourglass shape. For example, the lengthwise edges 32, 34 respectively define a first indentation 38 and a second indentation 40, which respectively define a first concavity 44 and a second concavity 46. The first indentation 38 generally opposes and is substantially a mirror image of the second indentation 40. Both indentations 38, 40 may include one or a plurality of contours 48, 50, 52 at least partially defining the cavities 44, 46. In the particular embodiment illustrated, both indentations 38, 40 include two pair of opposing convex contours 48, one pair of opposing concave contours 50 and one central concave contour 52. The carrier

18 may also include an opening 58 located between the first and second indentations 38, 40 and which is generally rectangular.

The heater, carrier or both may be shaped as desired and such shape may depend upon the application of the heater. Thus, the carrier or heater shape should not limit the present invention unless otherwise stated. As examples, the heater, carrier or both may include configurations that are circular, oval, elliptical, square, rectangular, geometric, non-geometric, symmetric, or asymmetric, or combinations thereof or the like. Furthermore, the heater, the carrier or both may be preformed (e.g. as planar or contoured) to correspond to an article such as a steering wheel or other article. Alternatively, the heater, the carrier or both may be flexible to allow of such correspondence.

In a preferred embodiment of the present invention, the carrier may be attached to one or more components of an article of manufacture (e.g. a seat, a mirror or the like). Alternatively, a first carrier may provide a release surface, which allows the first and second conductive medium to be transferred to one or more components of the article such that the one or more components become the carrier. This may be achieved according to various techniques such as appliqués, dissolvable substrates, removable substrates, or the like. Alternatively, the first and second conductive medium may be placed on one or more of the components of the article itself through printing, spraying, rolling, dabbing, brushing, pouring, or the like, again such that the one or more components become the carrier of the heater.

It is contemplated that the carrier 18 may be conductive, nonconductive, or partially conductive. This includes electric conductivity, thermal conductivity and diffusion. Also, for attachment purposes, the carrier may be configured to hold and maintain a static charge thereby allowing the carrier to attach itself to a component of an article (e.g. a mirror assembly, a seat or the like), with or without the use of adhesion or fastening techniques.

Alternatively, or in combination with the above, the carrier may further include one or more adhesive materials or layers for attaching the carrier to a component. The adhesive material may be applied to the carrier or, the carrier itself may comprise of adhesive material or have adhesive characteristics. The adhesive may be applied using such techniques as printing, spraying, rolling, dabbing, brushing, pouring or otherwise placed on one or both sides of the carrier.

The carrier 18 may be formed from various materials including polymeric materials such as plastics, elastomers, thermoplastics, composites or the like. The carrier 18 may also be formed of woven or non-woven fabric materials, paper materials, impregnated fibers, fibrous materials or the like. The carrier 18 preferably has a thickness between about 1 micron or less and 1 centimeter or greater, more preferably between about 10 microns and 1 millimeter, still more preferably between about 50 microns and about 200 microns.

One preferred material for the carrier is a polyester film that is commercially available under the tradename MELINEX®, designation number ST505, from the DuPont Company. Another preferred material for the carrier is a spunbound Olefin that is commercially available under the tradename TYVEK® also from the DuPont Company. Still another preferred material for the carrier is a polyester film that is commercially available under the tradename CETUS®, designation number CP2101, from the Cetus Company. Yet another preferred material for the carrier is a nylon polyester or polyether imide that is commercially available under the tradename ULTEM®, designation number 1000 or otherwise, from the General Electric Corporation.

Of course, other types of base substrate material are available for the carrier such as ceramic, glass, polymeric material (e.g. plastic, elastomers, thermoplastic, thermoset, or the like), polyesters, polyethylene, Mylar, woven material (e.g. nylon or cloth), or otherwise.

Preferred carriers have advantageous properties such as strength, flexibility, rigidity, elasticity, dielectric properties, a combination thereof or the like depending upon their application. Carriers may also be transparent, opaque, reflective or the like. Preferably, carriers are temperature resistant (e.g. up to 80° C. or more). Furthermore, carriers may exhibit relatively high acceptance to screen printing materials (e.g. polymers).

In preferred embodiments, particularly for seating applications, but for other applications as well, materials used for the carrier of the present invention exhibit an elongation at failure of as much or greater than 15%, more preferably greater that 35%, even more preferably greater than 50% and still more preferably greater than 70%. Also in preferred embodiments, the material used for the carrier of the present invention exhibit a dielectric constant of up to or greater than 0.5, more preferably greater than 1.0 and even more preferably greater than 2.0.

The first conductive medium 12 may be disposed upon the carrier 18 in a variety of configurations (e.g., in spaced parallel lines, zig-zags, serpentine, opposing interdigitated lines, etc.). Typically, the first conductive medium 12 is divided into a first or negative section 70 and a second or positive section 72 that are spaced apart from each other upon the carrier 18. Preferably, the negative section 70 does not directly electrically connect with the positive section 72. As used herein the terms "positive" and "negative" are only used because one of the sections 70, 72 will be electrically connected to a positive terminal of a power source while the other is electrically connected to a negative terminal as is further described below. It shall be understood that the sections 70, 72 may be interchanged or switched. Preferably, each of the sections 70, 72 respectively includes a base portion 74, 76 and a plurality of extensions 80, 82 extending outwardly from the base portions 74, 76. As shown, the plurality of extensions 80 of one section 70 are spaced apart from the plurality of extensions 82 of the other section 72. Moreover, the plurality of extensions 80 of the negative section 70 are spaced apart from each other and the plurality of extensions 82 of the positive section 72 are also spaced apart from each other.

In the particular embodiment illustrated, the base portion 74 of the negative section 70 extends along substantially the entire first lengthwise edge 32 of the carrier 18 while the base portion 76 of the positive section 72 extends along substantially the entire second lengthwise edge 34 of the carrier 34. As such both base portions 74, 76 include the same indentations 38, 40, cavities 44, 46 and contours 48, 50, 52 as the lengthwise edges 32, 34 of the carrier 18. The base portions 74, 76 also include an opening 88 extending down the center of the base portions 74, 76 adjacent the indentations 38, 40, cavities 44, 46 and contours 48, 50, 52.

The extensions 80, 82 are illustrated as elongated fingers that extend from one of the base portions 74, 76 toward the other of the base portions 74, 76 without actually contacting the other of the base portions 74, 76. As shown, particularly in FIG. 1, wherein only the first conductive medium 12 is disposed upon the carrier, the extensions 80 of the negative section 70 are interdigitated or intermittent with respect to the extensions 82 of the positive section 72 thereby forming gaps 90 between the extensions 80, 82.

The first conductive medium 12 may be formed of a variety of materials such as metals, conductive plastics, combinations thereof or the like. While it is contemplated that the first and second sections 70, 72 of the first conductive medium 12 may be formed of different materials, it is preferred that they be formed of one material. In a preferred embodiment, the first conductive medium 12 is formed of a polymeric material, which may be printed (e.g., screen printed) upon the carrier 18.

As an exemplary embodiment, the material for the first conductive medium 12 is a polymeric material such as a polymer thick film composition sold under the tradename POLYMER SILVER CONDUCTOR 5025, commercially available from DuPont, 1007 Market Street, Wilmington, Del. 19898. In such an embodiment, the first conductive medium 12 is typically screen printed upon the carrier 18 such that the medium 12 has a thickness of about 2 micrometers to about 4 millimeters, more preferably about 6 micrometers to about 1 millimeter and even more preferably about 12 to about 15 micrometers. Once printed, the conductive medium 12 is typically exposed to heat for curing. For example the carrier 18 and medium 12 may be placed within a box oven and the medium 12 cured for about 1 to about 10 minutes at a temperature between about 80° C. and about 180° C., more preferably for about 3 to about 8 minutes at a temperature between about 100° C. and about 140° C., still more preferably about 5 to about 6 minutes at a temperature of about 115° C. to about 125° C. As an alternative example, for a reel-to-reel screen printer, the carrier 18 and medium 12 may be exposed to temperatures of about 100° C. to about 200° C. for about 20 seconds to about 3 minutes, more preferably temperatures of about 120° C. to about 160° for about 40 seconds to about 2 minutes, still more preferably a temperature of about 140° C. for about one minute for curing the medium 12.

While, one or more configurations for the base portions have been discussed, it is contemplated that the base portions of the present invention may be arranged in numerous alternative configurations as well. As such, the base portions may be on opposite, adjacent or same sides of a carrier or may partially or completely overlapping having an interposed insulating material. The shape of the base portions may be geometric or non-geometric. Similarly, the base portion may be symmetrical or asymmetrical in shape. Some possible base portion shapes include: shapes having one or more arcuate boarders (e.g. round, circular, elliptical, oval, helical, combinations thereof or the like), shapes having one or more linear boarders (e.g. rectangular, square, equilateral or the like). It is also contemplated that the base portions may include a variety of both arcuate and linear borders.

In other embodiments, one base portion may be partially or fully enclosed within the other base portion. As an example, a first U-shaped base portion could partially surround a second corresponding U-shaped base portion with interdigitated or otherwise configured extensions extending from the base portions. As another example, a first base portion may be shaped in an enclosed configuration (e.g. as a circle, square, rectangle or the like) such that the second base (which may be of corresponding or non-corresponding shape) portion is substantially enclosed within the first base portion. In either example, the heater may include extensions in any configuration described herein.

While only two base portions are shown, it is foreseeable that additional base portions may be used. Also, the number of electrically positive base portions may or may not be equal to that of the electrically negative base portions.

Accordingly, as with the base portions, the extensions can be arranged in different patterns with respect to the base portions and each other. Some possible patterns include interdigitated serpentine, straight, curved, spiral, rectangular, zigzag, or otherwise. In the embodiment shown in FIG. 2, each first extension from the first base portion is separated from the next closest first extension by no more than one second extension from the second base portions However, it is contemplated that a first extension from the first base portion may be separated from the next closest first extension by two or more second extension from the second base portion. In such an embodiment, it is preferably although not required that the second conductive medium interconnects only first extensions from the first base portion with second extensions from the second base portion.

Additionally, it is contemplated that two sections of the first conductive medium may form an overlapping relationship in order to create a more desirable circuit for selective heat generation of the heater. For example, as illustrated in the embodiment shown in FIG. 9, though discussed in greater detail below, a first section of the first conductive medium may be configured in an overlapping relationship with a second section. In such an instance, an insulating or nonconducting material typically interposes the first and second sections, to prevent currents from traveling directly from one section to another section without passing through the second conductive medium. Of course, direct passage of current between sections may be desirable in some instances (e.g. such that current only passes through a portion of the second conductive medium). However, the first and second sections may alternatively be interposed by the second conductive medium, or otherwise to provide a heating circuit. For example, a second conductive medium may be sandwiched between a portion of the first and second section. As such, when a current travels from the first and second section, it is possible for the second conductive to generate heat therebetween.

This overlapping relationship of the different sections of the first conductive medium provides the ability to form more intricate circuit designs. One advantage of having more intricate circuits is the ability to generate multiple heat outputs from a single heating unit. Another advantage is the ability to provide a heating unit having more then one heating regions that are selectively activated.

In any of the possible base portion configurations, the width and thickness of the portion may be consistent throughout, variable, or progressively narrowing or expanding. Likewise, the width and thickness of an extension from the first or second base portions may be consistent, variable, or progressively narrowing or expanding. Furthermore, the thickness, length and width of the first and second extensions may vary throughout the heater. Moreover, the extensions may be parallel, skew, nonparallel or the like relative to each other, the base portions, the extensions from the other base portion or relative to the second conductive medium.

As with the base portions, the extensions from either of the base portions may overlap each other wherein nonconductive medium is placed between the overlapped regions.

The material of the base portion and the extensions may be the same or different material depending on the application. Moreover, the extensions may be interconnected by the second conductive medium such that the base portions are connected.

Alternatively, it is contemplated that there are no extensions and the base portions are in direct contact with a conductive medium. Examples of this configuration includes the overlapping of the base portions having an interposed conductive medium. In another example, the base portions may be configured adjacently, or otherwise, having a conductive material interposed. In the above examples, the application of more than two base portions may be desired.

Referring to FIGS. 2 and 3, the second conductive medium 14 may be disposed upon the carrier 18 in a variety of configurations. The second conductive medium 14 may be continuous, intermittent, planar, geometric, contoured, combinations thereof or the like. Preferably, the second conductive medium 14 electrically connects the positive section 72 of the first conductive medium 12 with the negative section 70 of the first conductive medium 12.

In the exemplary embodiment illustrated in FIG. 2, the second conductive medium 14 includes a plurality of strips 94, which are shown as separate from each other, but which may be interconnected. Each of the strips 94 is elongated and extends with and/or preferably parallel to the extensions 80, 82 of the first conductive medium 12 and each strip 94 electrically connects an extension 80 of the negative section 70 with an extension 82 of the positive section 72. As shown, each of the strips 94 overlaps and directly contacts one extension 80 of the negative section 70 and one extension 82 of the positive section 72.

It is also for preferred, but not necessarily required, that each of the plurality of strips 94 have substantially the same size and shape and that the strips 94 be substantially uniformly spaced apart from each other. Moreover, it is preferable for the strips 94 to have uniform densities compared to each other and throughout each strip 94. In this manner, the heater 10 can typically produce a more uniform heat intensity along the length and/or width of the heater 10.

The second conductive medium 14 may be formed of a variety of materials including metal, plastics or combinations thereof. Preferably, the material exhibits relatively high positive thermal coefficient (PTC) as will be discussed further below. While it is contemplated that the strips 94 may be formed of different materials, it is preferred that they be formed of one material. In a preferred embodiment, the second conductive medium 14 is formed of a polymeric material, which may be printed (e.g., screen printed) upon the carrier 18.

In an exemplary embodiment, the material for the second conductive medium 14 may be a polymeric material such as a polymer thick film composition sold under the tradename PTC CARBON RESISTOR 7282, commercially available from DuPont, 1007 Market Street, Wilmington, Del. 19898. In such an embodiment, the second conductive medium 14 is typically screen printed upon the carrier 18 such that the medium 14 has a thickness of about 1 micrometer to about 1 millimeter, more preferably about 3 micrometers to about 10 micrometers and even more preferably about 6 to about 8 micrometers. Alternate printing methods include silk screen printing, ink jet printing or the like. Once printed, the conductive medium 14 is typically exposed to heat for curing. For example, the carrier 18 and medium 14 may be placed within a box oven and cured for about 2 to about 30 minutes at a temperature between about 90° C. and about 200° C., more preferably about 5 to about 15 minutes at a temperature of about 110° C. to about 150° C., still more preferably about 10 minutes at temperature of about 130° C. As another example, for a belt drier, the carrier and medium 14 may be exposed to temperatures of about 110° C. to about 210° C. for about 1 minute to about 20 minutes, more preferably temperatures of about 130° C. to about 170° for about 2 minutes to about 10 minutes, still more preferably a temperature of about 150° C. for about 3 to about 5 minutes.

Other conductive mediums used in the above printing methods include aqueous polymers including conductive fillers (e.g. conductive metal powder, metallic oxide, silver, copper or otherwise), resistive fillers (e.g. carbon or otherwise), films (e.g. polyurethane, UV curable Polymeric dielectric composition, thermosetting resins (e.g. epoxies, phenol resins, or the like), or otherwise), ethylene vinyl acetate co-polymer resin having black carbon or a combination thereof. Preferably, the ink is impermeable to light and may include one or more of the following binders: resin-based acrylic ink, borosilicate lead-glass, thermosetting resins (e.g. epoxy, phenol, melamine resin), or conductive powder.

The second conductive medium may be applied in a variety of patterns alternative to that which is shown. In one embodiment, the conductive medium may emulate (e.g. extend parallel) the pattern of the first and second base portion. Preferably, the conductive medium is at least partially interposed between the extensions of the first and second base portions. When provided as strips or otherwise, the conductive material may be parallel, angled, skew, perpendicular, serpentine with respect to the extensions of the base portions or the base portions themselves. Also the pattern of the second conductive medium may be comprised of concentric or non-concentric geometric configurations, e.g. circles, squares, oval, or otherwise. Furthermore, the second conductive medium may be randomly or systematically place between extension of the base portions, or between the base portions, and may comprise a plurality of strips having cut out portions. The strips of the conductive material may also be sectioned or broken into pieces.

While preferred material for the first and second conductive mediums have been disclosed, it is contemplated that other materials may be employed as layers or otherwise for providing part or all of the first and second conductive mediums. Examples of these materials include: foil tape, transfer paper, strips sheets, sleeves, strands of electrically conductive thread, wire, deposited metal, plated material, sewn material or otherwise. Other materials include: metals (e.g. aluminum, chromium, nichrome, or otherwise), carbon, film, foam (either thermally or non thermally conductive) (e.g. Comfortem® by foam international), electrically conductive woven fabric having a conductive coating such as silver, polymeric material (applied as a film or printed, discussed more below).

The heater 10 of the present invention also typically includes one or more (e.g. a pair of) electrical connections 100, 102. Preferably, each of the connections 100, 102 is respectively in electric communication with one of the base portions 74, 76 of the negative and positive sections 70, 72.

Figure 2A:
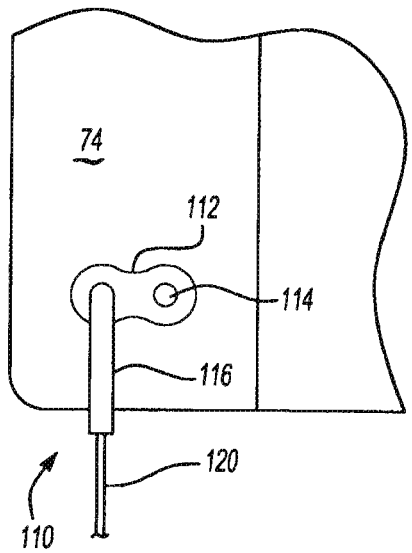
FIG. 2A is a top view of an exemplary alternative electrical connection suitable for a heater of the present invention.

It shall be understood by those skilled in the art that a variety of electrical connections may be employed. In the particular embodiment of FIG. 2, each of the electrical connections 100, 102 includes a wire 104 (e.g., a coated copper conductive wire) having an end 106 that is attached (e.g. soldered) to a foil patch 108 (e.g., of electrically conductive tape) and the patch 108 with the end 106 is attached (e.g., adhered) to one of the base portions 74, 76. In an alternative exemplary embodiment, and referring to FIG. 2A, an electrical connection 110 is employed wherein a member 112 includes a rivet 114 connected to one of the base portions 74 and an eyelet 116 connected to a wire 120.

Advantageously, the heater of the present invention may be formed with only one or two electrical connections for providing a current through the base portions, the extension, the second conductive medium (e.g. the strips) or a combination thereof. Of course, additional connections may be used if desired or needed. As an added value, the heater 10 can be formed with the entirety of the first and second conductors supported by the single carrier 18 without requiring additional layers for supporting the conductors. Of course, additional layers may be used if needed or desired.

The electrical connections may be located on the same side of the carrier. Alternatively, the electrical connections may be located on opposite or adjacent sides of the carrier. Also, the electrical connections may be diagonally opposite each other on the carrier. Thus, the electrical connections may be situated such that the summation of the electrical paths between adjacent portions of the extension are substantially equivalent or substantially non equivalent.

The electrical connections may be integrated into a single unit, having both positive and negative leads, or may be separated into two or more connections. Furthermore, the electrical connections may be integrated into a single extension or "tail", or multiple "tails", used to electrically connect the heater to a power or energy source (e.g. a battery).

The heater of the present invention may be capable of operating at one or multiple heat outputs. Various techniques may be used for producing multiple heat outputs. For example, referring to FIGS. 8 and 9, two or more circuits may be configured to operate at different output levels and may be disposed or printed on one, two or more carriers. Alternatively, referring to any of the embodiments contained herein, two or more sets of electrical connections could deliver different energy levels (e.g. voltages) to one, two or more circuits printed onto one, two or more carriers. Moreover, one, two or more electrical connections may be configured for delivering different output levels for delivering different output levels to the above configured heaters.

The present invention may further comprise one or more control safety features including: thermostat, control module with Negative Temperature Coefficient (NTC) resistor, Positive Temperature Coefficient fuse or some other temperature sensing device. Also, a Constant Temperature Coefficient (CTC) may be used for eliminating the effect of the temperature of the heating element on the amount of heat generated by the heating element. The above features can allow the system to shut down upon sensing of excessive temperatures or a short in the system.

Also, the present invention may be configured with one or more switches (e.g. a latch switch or momentary switch), for applying a current to the heater of the present invention. For example, a control module may be used in conjunction with a momentary switch for turning the heating device on and off. Alternatively, a switch (e.g. an on/off switch) may be used to physically connect and/or disconnect a circuit that includes the heater with an energy source. Other switches that may be used includes a voltage control potentiometer, multiple position switch for allowing choice of temperature settings (e.g. high-low-off), multi-pole switch or otherwise.

The heater of the present invention is electrically connected to an energy source to generate a current through the heater to produce heat. The energy source may provide an alternating current, a direct current, or a combination thereof. In an automotive application, preferably the heater is electrically connected to an automotive energy supply, (e.g. 12 volt battery). Alternatively, or additionally, the heater may be connected to the alternator, control module or other electrical components in the vehicle.

In any of the discussed embodiments, including FIG. 3, an insulation layer 130 may be laminated over the conductive mediums 12, 14 of the heater 10. The insulation layer 130 may be formed of fleece, gauze or the like and may be fastened to the carrier 18 via adhesive or otherwise.

While FIG. 3 has been illustrated with an insulation layer 130, it is contemplated that the heater 10 may advantageously be formed without any such additional insulation layer 130. Moreover, it is contemplated that the insulation layer 130 may be provided by the seat (e.g., as part of a trim layer) and that the insulation material may not be specifically adhered or otherwise attached to the heater 10. The application of the insulating material is numerous and at a minimum includes the methods used below in applying the protective coating.

As another option, the first conductive medium 12, the second conductive medium 14, or both may be fully or partially covered with a protective coating. In a preferred embodiment, the first and second conductive mediums 12, 14 are coated with a protective dielectric coating formed of a polymeric dielectric composition. Preferably, the coating is curable (e.g., UV curable), solvent less or a combination thereof. The coating may be applied to the conductive mediums 12, 14 by several methods such as printing, spraying, rolling, dabbing, brushing, pouring or the like, but is preferably screen printed upon the mediums 12, 14. The coating may be up to 5 millimeters thick or greater and is preferably between about 10 microns and about 4 millimeters thick, more preferably between about 100 microns and about 3 millimeters thick (e.g., between about 1 to about 1.2 millimeters thick). In a preferred embodiment, the protective layer has electrical, or thermal, insulating characteristics.

Materials available for both the insulating layer and protective layer include the same materials used for the carrier. Additional layers that may be used for the insulating and protective layers having di-electric properties include: paper, film (e.g. polyurethane, UV curable polymeric dielectric composition, thermosetting resins or otherwise), vinyl sheet, fleece, gauze, flexible sheets (e.g. elastomeric, polyester terephthalate, polycarbonates, or otherwise), foam (e.g. thermally conductive, non-thermally conductive, polyurethane, neoprene, or otherwise), glass or the like. However, a protective layer may be conductive in certain layered configurations.

In any of the embodiment of the present invention, it is contemplated that an adhesive is disposed on either side of the carrier or conductive mediums prior to the heater of the present invention being applied to a specific article (e.g. a seat cover, mirror or otherwise). It is also contemplated that adhesives may be on both sides of the carrier to adhere to one or more additional components associated with the heater such as a protective layer or otherwise. Also, it is contemplated that no adhesives are used in the present invention but instead static electricity or some other self attachment is used to mount or fix the heater to a specified region of the article.

Vehicle Seat and Mirror Applications

Figure 5:
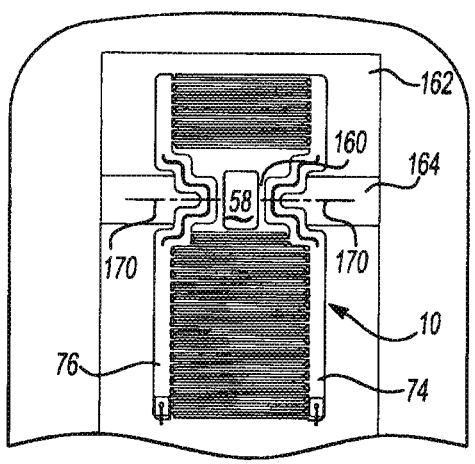
FIG. 5 is a top view of a portion of a seat of an automotive vehicle formed in accordance with an exemplary aspect of the present invention.
Figure 4:
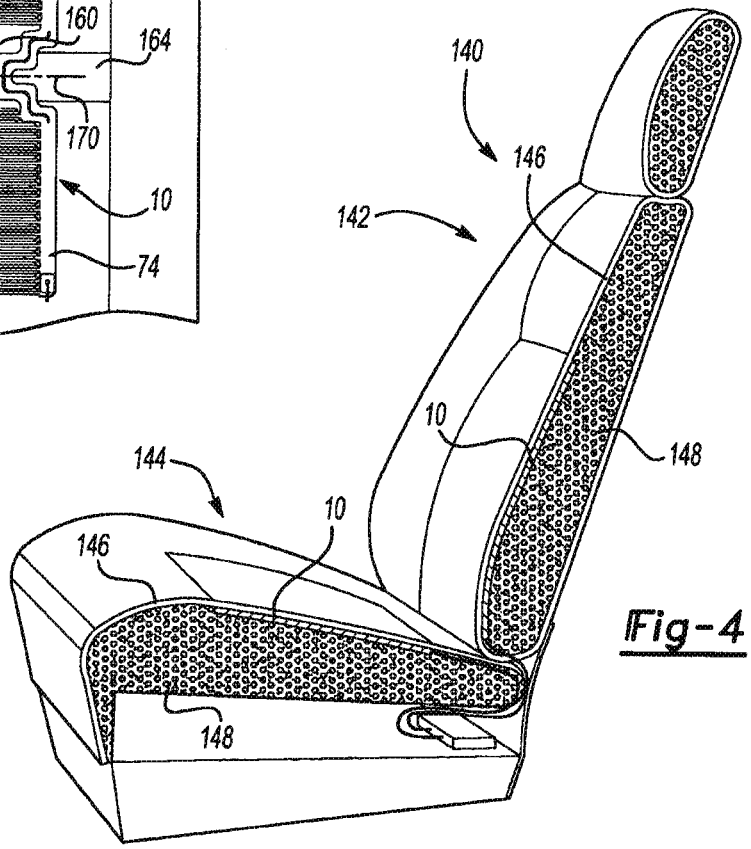
FIG. 4 is a partially cut away perspective view of a seat of an automotive vehicle formed in accordance with an exemplary aspect of the present invention.

As previously discussed, the heater 10 of the present invention may be integrated into various articles of manufacture. Referring specifically to FIGS. 4 and 5, as an example, the heater 10 is shown integrated into a seat 140 of a vehicle. The heater 10 of the present invention may be located in various portions of an automotive vehicle seat such as a support portion, a backrest portion, a shoulder support portion or a headrest. The heater may be located between the trim of the seat and the foam cushioning of the seat. The heater may also be integrated into the trim of the seat, the foam cushioning of the seat or both.

Referring to FIG. 4, the seat 140 is illustrated with the heater 10 of FIGS. 2 and 3 positioned in both a seat backrest component 142 and a seat support component 144. In the embodiment illustrated, each component 142, 144 of the seat 140 includes a trim layer 146 and a foam cushion 148 and each of the heaters 10 is positioned substantially between the foam cushion 148 and trim layer 146. Preferably, each heater 10 is fastened to the seat 140 (e.g., the trim layer 146, the cushion 148 or both) for maintaining the heater 10 stationary relative to the seat 140. It is also contemplated that tape 150 (e.g., two-way tape), as shown in FIG. 3, or other fasteners or adhesives may be employed to fasten the heater 10 to the seat 140 and particularly the foam cushion 148.

In a highly preferred embodiment shown in FIG. 5, a central portion 160 of the heater 10 is tied down atop a foam cushion 162 of a seat with the central portion 160 extending at least partially into a cavity 164 (e.g., a trench) of the cushion 162. As shown, tie strings 170 extend through the opening 58 over the top of the central portion 160 of the heater 10 to tie the heater 10 down. Advantageously, the contours 48, 50, 52 of the carrier 18 and the first conductive medium 12 curve about foam cushion 162 at the cavity 164 when the central portion 160 of the heater 10 is extended into the cushion 162 thereby relieving stress that might otherwise be placed upon the first conductive medium 12 and particularly the base portions 74, 76 of the first conductive medium 12. Moreover, the opening 58 also serves to relieve stress as the central portion 160 of the heater 10 is extended into the cushion. While the contours 48, 50, 52 and opening 58 have been employed for relieving stress during application to a foam cushion 162, it should be understood that the contours 48, 50, 52 and opening 58 may also assist in relieving stress wherever the heater 10 curves about an object to which it is applied.

Figure 6:
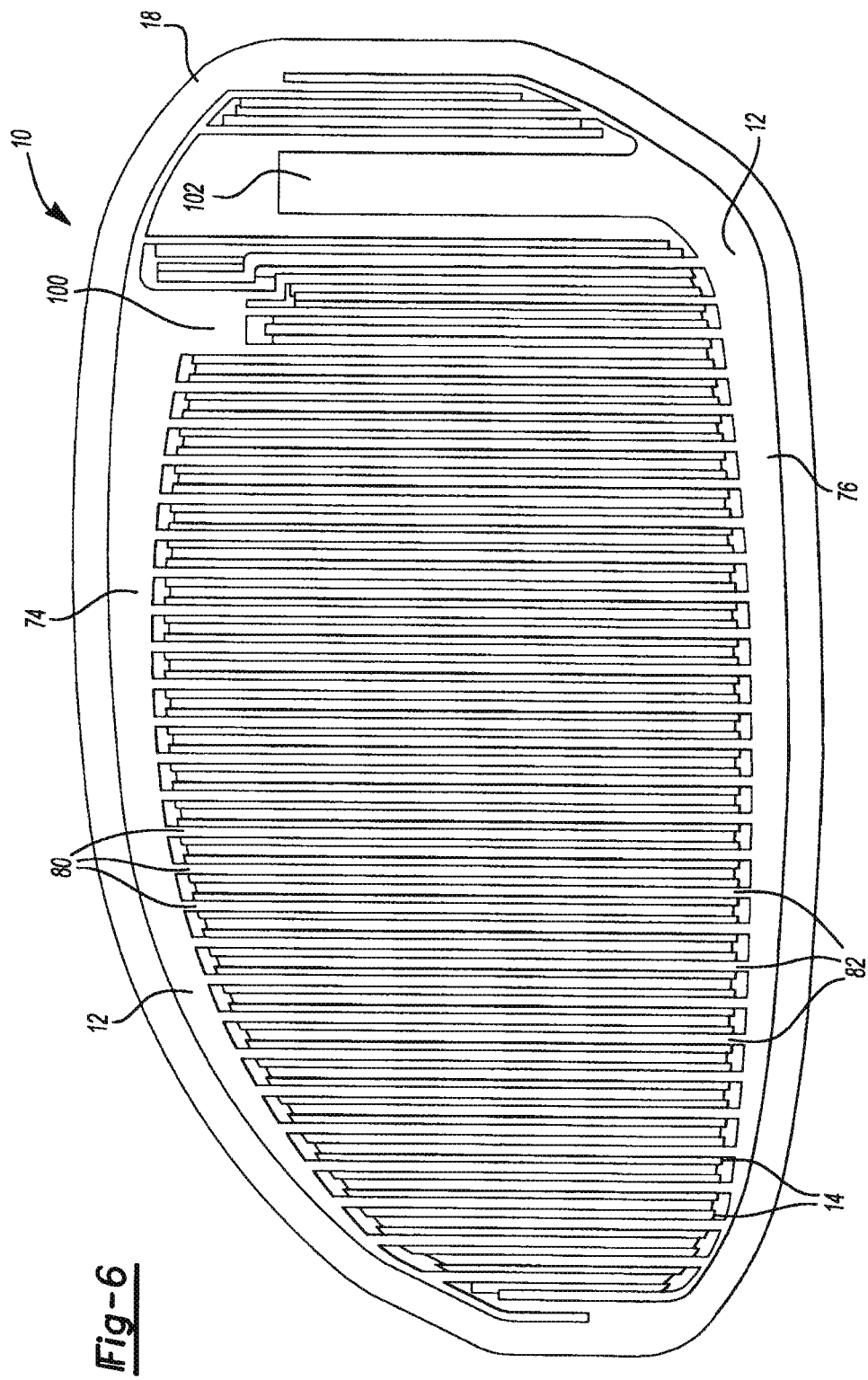
FIG. 6 is a top view of an exemplary heater for an automotive mirror in accordance with an exemplary aspect of the present invention.

In one alternate embodiment, the present invention is integrated with a mirror assembly. In such an embodiment, the shape of the heater, carrier or both is likely to change to the corresponding shape of the mirror assembly. An example of such an embodiment is shown in FIG. 6, wherein the heater 10 is configured with a carrier 18, a first conductive medium 12 and a second conductive medium 14.

The first conductive medium 12 is preferably configured with a first base portion 74 and a second base portion 76 having associated first and second oppositely charged electrical connectors 100, 102 respectively. Preferably, the shape of the first and second base portions 74, 76, the carrier 18 or both conform to the shape of the mirror 12, backing or both. Furthermore, it is contemplated that the first and second base portions 74, 76 may have varying widths as they extend along the carrier 14.

Extending from the first and second base portions 74, 76 are a plurality of interdigitted first and second extensions 80, 82 having varying lengths (e.g., becoming progressively larger or smaller) according to the contours of the first and second base portions 74, 76 and the contours of the mirror. Preferably the extensions 80, 82 are parallel with respect to each other, however, other configurations are contemplated as disclosed herein. Also, other patterns are contemplated as disclosed herein.

Preferably, each of the sections 70, 72 respectively includes a base portion 74, 76 and a plurality of extensions 80, 82 extending outwardly from the base portions 74, 76. As shown, the plurality of extensions 80 of one section 70 are spaced apart from the plurality of extensions 82 of the other section 72. Moreover, the plurality of extensions 80 of the negative section 70 are spaced apart from each other and the plurality of extensions 82 of the positive section 72 are also spaced apart from each other.

Figure 7:
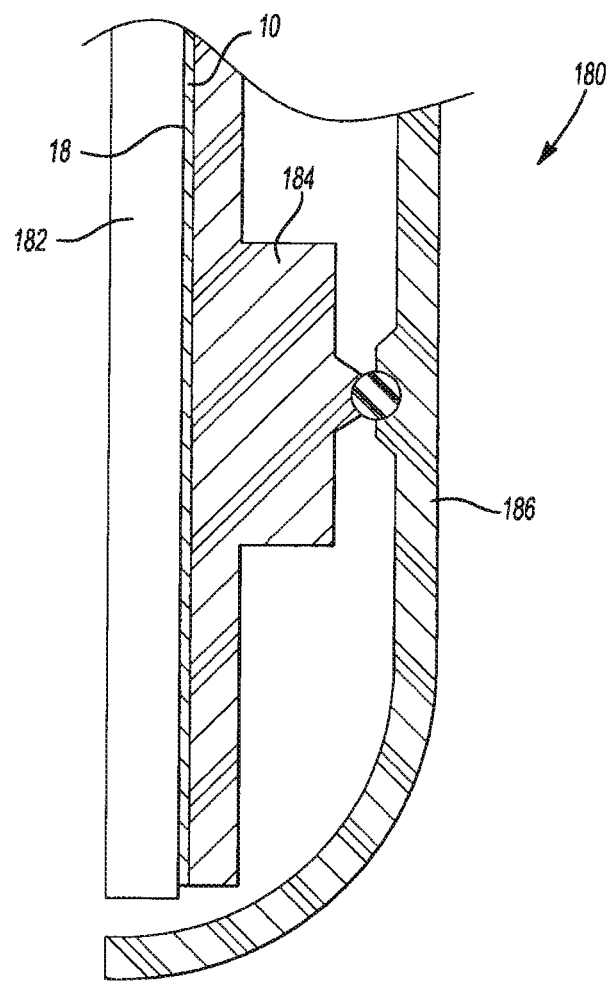
FIG. 7 is a cross-sectional view of a mirror assembly in accordance with an exemplary aspect of the present invention.

Alternatively in another embodiment, referring to FIG. 7, the heater 10 of the present invention may be applied to, or incorporated with, a mirror assembly 180 (e.g. side mirror, rear view mirror, or the like). The mirror assembly 180 is typically configured with a mirror 182, a mirror backing 184 and a housing 186, although each component is not necessarily required. In the illustrated embodiment, the heater 10 includes a carrier 18 that is attached to the mirror 182, the backing 184 or both. Alternatively, however, it is contemplated that the mirror 182 or backing 184 may be the carrier for the conductive mediums of the heater 10.

The carrier 18 may be applied to (e.g. attached to) the mirror 182, the backing 184 or both using a variety of techniques. In one embodiment, the attachment of the heater 10 to the mirror 182 or backing 184 may be accomplished with adhesives, fasteners, combinations thereof or the like. Alternatively, the heater 10 may be attached without the use of adhesives or fasteners. For example, the heater 10 may be statically adhered to the mirror 182 or backing 184. As another alternative, the carrier 18 may be composed of a material having adhesive characteristics for adhering the heater 10 to the mirror assembly 180.

Alternatively or additionally, it is contemplated that the mirror assembly may be configured for securing the heater 10 to itself. For example, the mirror 182, the backing 184 or both may include one or more recesses for receiving and securing the heater 10 thereto. As another example, the heater 10 may be sandwiched and secured between the mirror 182 and the backing 184. Moreover, the mirror assembly 180 may be configured with integral fasteners (e.g. snap-fits) for securing the heater 10.

In addition to the first conductive medium 12 and the second conductive medium 14, the electrical connectors 100, 102 may be directly attached to the mirror 182, the backing 184 or both. Advantageously, any portion of the heater 10 not disposed or incorporated on a portion of the mirror assembly 180, may be adhered or fastened to the mirror assembly 180 using any of the techniques described herein. For example, the mirror 182 or backing 184 may be coated with the second conductive medium 14 while the first conductive 12 medium may be placed over the second conductive 14 according to a different technique. Further, it is contemplated that the mirror 182 contacts either the first conductive medium, the second conductive medium or both. Optionally however, one or more additional layers (e.g. insulating, protective, otherwise or a combination thereof) as described herein may be place over the first conductive medium 12 as desired.

In operation, the heater 10 can operate to heat the mirror 182 in substantially the same manner as the heater can be used to heat a seat. Advantageously, the heater can assist in removing water in the form of condensation, frost or otherwise from the mirror 182.

Operation

In operation, and referring to FIGS. 2 and 4 one electrical connection 102 is connected to a positive terminal of an electrical power source (not shown) and the other connection 100 is connected to a negative terminal of the electrical power source. In turn, when the power source provides electrical energy to the heater 10, an electrical current flows from one electrical connection 100 to the base portion 74 of the negative section 70 of the first conductive medium 12. The electricity then flows to the extensions 80 of the negative section 70 and through the strips 94 of the second conductive medium 14 to the extensions 82 of the positive section 72 of the first conductive medium 12. Thereafter, the electricity flows to and through the base portion 76 of the positive section 72 of the first conductive medium 12 and out of the heater 10 through the electrical connection 102. Due to the resistance of the second conductive medium 14, the strips 94 elevate in temperature thereby heating the seat 10, and particularly the trim 146 of the seat 140. Advantageously, the strips 94 of the second conductive medium 14 exhibit positive thermal coefficient characterization such that the strips 94 are self-limiting with regard to how warm they will become. More specifically, for a particular voltage applied to the second conductive medium 14, the resistance of the second conductive medium 14 will rise, which in turn, causes the current flowing through the second conductive medium 14 to become lower until an equilibrium is attained. As will be recognized by the skilled artisan, various variables such as the voltage applied to the heater, the composition of the second conductive medium 14, the size and configuration of the second conductive medium 14 and others may be varied such that the equilibrium for the medium 14 is achieved at desired heat output. It is also contemplated that, after use, the resistance of the second conductive medium may shift (e.g., upwardly shift) between about 15% and about 25%. If such is the case, it is typically desirable to design the configuration of the second conductive medium to account for the shift while still producing the preferred heat output.

In preferred embodiments, the distance between the positive section of the first conductive medium and the negative section of the first conductive medium (i.e., the distance that the second conductive medium spans to interconnect the sections) may be set to assist in controlling the temperature of the second conductive medium, the heater or both during operation. In the preferred illustrated embodiment, the extensions 82 of the positive section 72 are typically separated from the extensions 80 of the negative section 70 by a distance of about 0.5 millimeter to about 1 centimeter, more preferably about 1.5 millimeters to about 5 millimeters, still more preferably about 3 millimeters. Also in the preferred embodiment, the second conductive medium 14, the heater 10 or both reach a temperature between about 0.0° C. and about 100° C., more preferably between about 25° C. and about 80° C., still more preferably between about 50° C. and about 70° C.

In addition to the previous embodiments, it is also contemplated within the scope of the present invention that the heater can include a first conductive medium having at least three sections, which are interposed by a second conductive medium. In such an embodiment all three sections of the first conductive medium can be electrically connected through the second conductive medium thereby providing the ability to form multiple heating circuits. For example, one or more circuits may be created between a first and second section, the first and third sections, the second and third section or between all three sections. Also, with the use of a first conductive medium having at least three sections, numerous circuits may be selectively generated between any two sections having an interposed second conductive medium. As such, preferred heating regions may be generated.

In this alternate configuration, one section of the first conductive medium is connected to a first or positive terminal and another section is connected to a second or negative terminal of a power supply for forming a first heating circuit. By connecting yet another section of the first conductive medium to the positive or negative terminal of a power supply, a second heating circuit may be generated between this section and any other section (e.g., the aforementioned sections or additional sections) connected to an oppositely charged terminal.

Advantageously, a switching device, as disclosed herein, may be used for selectively and electrically connecting the sections of the first conductive medium to the positive or negative terminal of a power supply. Moreover, it should be understood that the materials discussed for the carrier, the first and second conductive mediums may also be appropriately employed in the following embodiments and may be applied as previously discussed. It is also contemplated that the following embodiments may include an insulation layer that may be formed of the same materials and applied to the carrier, the conductive medium or a combination thereof as described in the previous embodiments.

Figure 8:
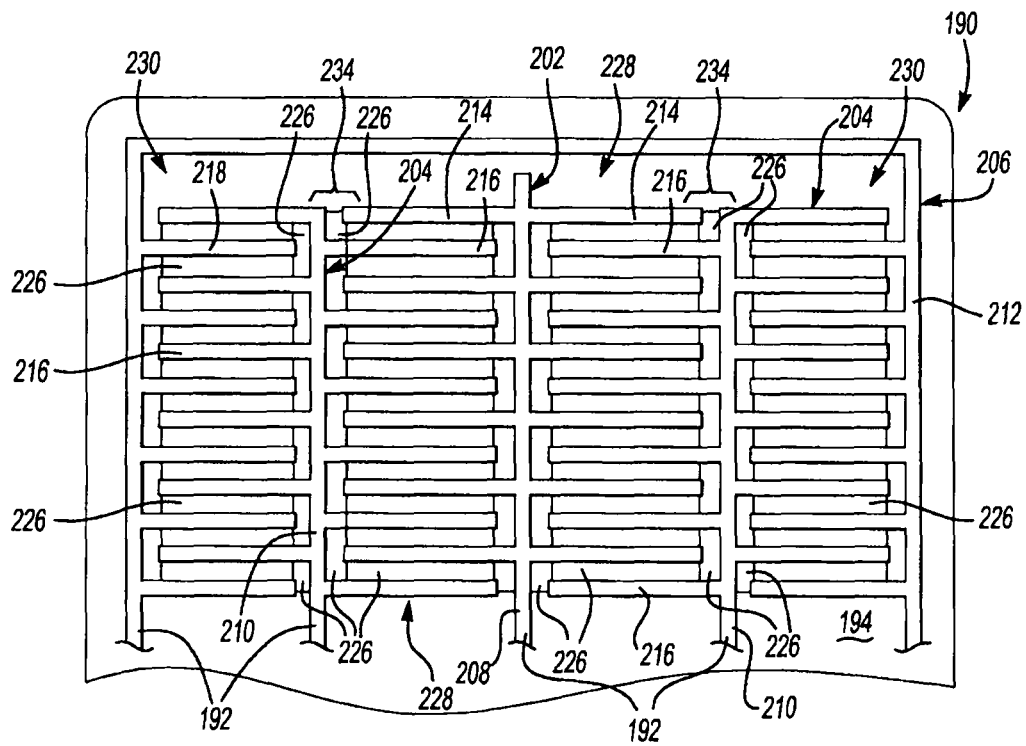
FIG. 8 is a top view of a portion of another heater in accordance with an exemplary aspect of the invention.
Figure 9:
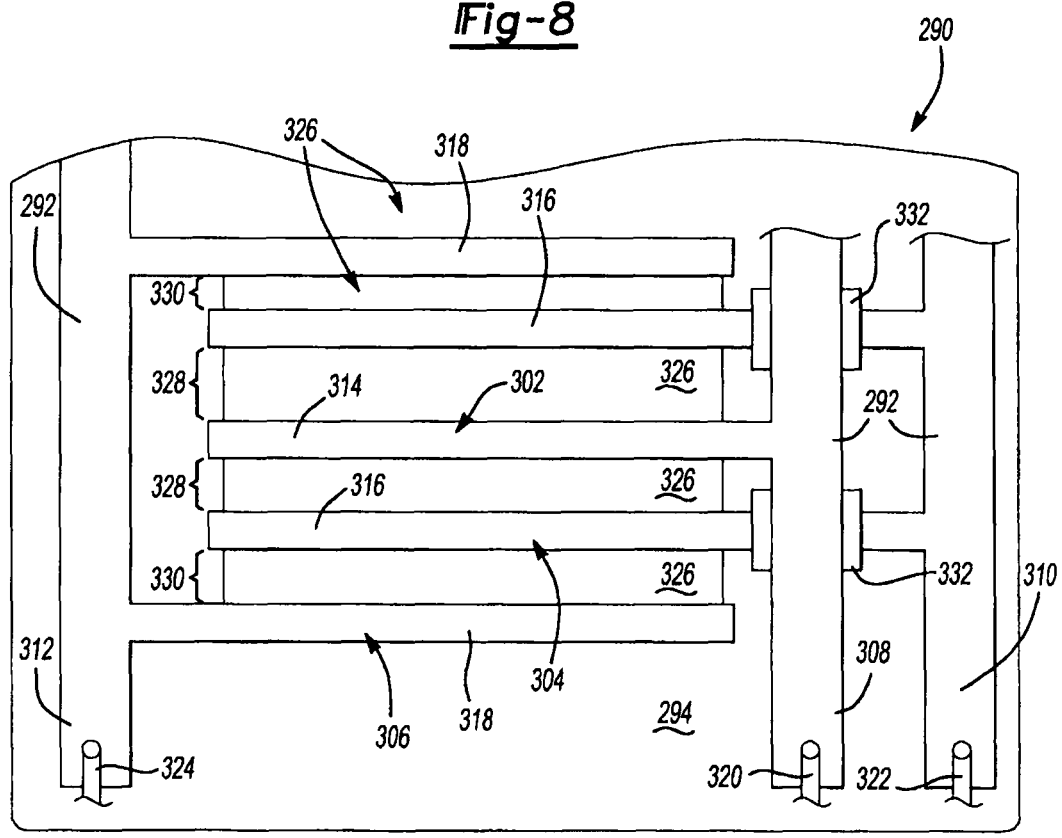
FIG. 9 is a top view of a portion of yet another heater in accordance with an exemplary aspect of the invention.

Accordingly, as shown in FIGS. 8 and 9, (FIG. 9 reference numbers in brackets) there are illustrated two examples of an exemplary heater 190 (290) that is configured with a first conductive medium 192 (292) having at least three sections applied to a carrier 194 (294). The at least three sections include a first section 202 (302), a second section 204 (304) and a third section 206 (306). Preferably, the first, second and third sections 202, 204 and 206 (302, 304 and 306) are each respectively configured with a base portions 208, 210 and 212 (308, 310 and 312) and a plurality of extensions 214, 216 and 218 (314, 316 and 318) respectively extending from the base portion 208, 210 and 212 (308, 310 and 312). As with the other embodiments contained herein, it is contemplated that each of the first, second and third sections 202, 204 and 206 (302, 304 and 306) are further configured with electrical connections 220 (330) adapted for connecting the at least three sections to a power source. Advantageously, a control device (e.g., a switching device or other device) is used for selectively connecting the at least three sections to a positive or negative terminal of a power supply.

Generally it is contemplated that sections of the first conductive medium 192 (292) may be connected through the second conductive medium 226 (326). For example, it is contemplated that any extension, base portion, or other part of a section may be connected to any other extension, base portion or other part of a section through an application of the second conductive medium 226 (326) over a portion or all of the carrier 194 (294). In this exemplary embodiment, the first conductive medium 192 (292) is applied to the carrier 194 (294) and is optionally partially or fully covered by a second conductive medium 226 (326). As such, a completed circuit may be achieved by electrically connecting i) the power supply, ii) any section of a first conductive medium, iii) the second conductive medium, and iv) any other section of a first conductive medium, wherein each completed circuit may heat different portions of the heater and/or change its heat output. Advantageously, a switching device may be utilized to selectively direct current through the first and second conductive medium.

A user can energize any two sections of the at least three sections to heat a region of the second conductive medium located between the two sections. Likewise, a user can energize more than two sections, of the at least three sections to heat additional regions of the second conductive medium to increase the overall heat output of the heater 190 (290).

Referring to FIG. 8 in more detail, a portion of the heater 190 is configured with a first conductive medium 192 applied to a carrier 194. The first conductive medium 192 is configured with at least three sections, namely the first, second and third sections 202, 204 and 206.

The first section 202 is preferably centrally located with respect to the width of the carrier 194 and comprises a base portion 208 that extends along the length of the carrier 194. Extending transverse to the length of the carrier 194 is a plurality of spaced apart extensions 214, which are preferably skew (e.g. substantially perpendicular) to the first base portion 208. Advantageously, the extensions may extend out from one or both sides of the first base portion 208 and optionally, extensions extending from one side may be aligned or staggered relative to extensions extending from the opposite side. Though not shown, the first section 202 is connected to a switching device, which selectively connects the first section 202 to either a negative or positive terminal of a power supply.

The second section 204 comprises two base portions 210 which extend along the length of the carrier 194 and preferably coextensive (e.g., substantially parallel) with the the first base portion 208. As with the first base portion 208, the second base portions 210 are configured with a plurality of spaced apart second extensions 216 that extend transversely relative to the length of the carrier 194 and are preferably skew (e.g., substantially perpendicular) to the second base portions 210. As with the first extensions 214, the second extensions 216 extend from both sides of the second base portions 210. However, in contrast to the first extensions 214, the second extension 216 are extending from one side of the base portions 210 the are shown as staggered with respect to extensions 216 extending from the other side of the base portions 210 but may alternatively be in an aligned configuration.

Advantageously, the spaced apart second extensions 216 interpose the first extensions 214 and are in an interdigitated configuration. The first and second extension are spaced apart from each other and interposed by strips of second conductive medium 226, or otherwise, which preferably overlaps at least a portion of the first and second extensions 214, 216. In the embodiment shown, the second conductive medium 226 that is located between the first and second extensions 214, 216 forms a first heat region 228. Both of the second base portions 210 are connected to a switching device, which can selectively connect the second section 204 to the terminal, opposite in charge, to the first section 202.

The third section 206 comprises a single third base portion 212 which extends about the periphery of at least a portion of the carrier 194 and more preferably about the majority of the periphery. However, it should be appreciated that it is not necessary for the third base portion to extend about the majority of the periphery as the third base portion 212 may be segmented into two or more third base portions 212. As with the first and second base portions 206, 208, the third base portion 212 is configured with a plurality of spaced apart third extensions 218 that extend transversely relative to the length of the carrier 194 and preferably extend skew (e.g. substantially perpendicular) to the third base portion 212. In this exemplary embodiment, the third extensions 218 extend from one side of the third base portions. In this configuration, the extensions of the third section extend inward toward the second base portions so as to become interposed and interdigitated with second extensions 216 that extend toward the third base portion.

The second and third extensions 216, 218 are spaced apart from each other and interposed by strips of second conductive medium 226, or otherwise, which preferably overlaps at least a portion of the second and third extensions 216, 218. The second conductive medium 226 located between the second and third extensions 216, 218 form a second heating region 230. The third base portion 212 is connected to a switching device, which selectively connects the third section 206 to the terminal, opposite in charge, to either the first section 202 or the second section 204. Preferably the third base portion 212 is selectively connected to the terminal which is opposite in charge to the second section 204.

Referring to FIG. 9 in more detail, a portion of a heater 290 is configured with a first conductive medium 292 applied to a carrier 294. As with the exemplary embodiment illustrated in FIG. 8, the first conductive medium 292 is configured with at least three sections, namely the first, second and third sections 302, 304 and 306. However, in this configuration at least one overlapping relationship exits between the at least three sections.

The first section 302 is preferably centrally located with respect to the second and third section 304, 306 and comprises a base portion 308 that extends along the length of the carrier 294. Extending transverse relative to the length of the carrier 294 is a plurality of spaced apart extensions 314 (though only one is shown), which are preferably skew (e.g., perpendicular) to the first base portion 308. The extensions 314 are shown as extending from one side of the first base portion 308, but may extend out from one or both sides of the first base portion 308. Preferably, the first section 302 is connected to a switching device through an electrical connection 320, which selectively connects the first section 302 to either a negative or positive terminal of a power supply.

The second section 304 comprises a second base portion 310 extending along the lengthwise edge of the carrier 294. The second base portion 310 is shown as being substantially coextensive with (e.g., parallel to) and adjacent the first base portion 308, although not necessarily required. The second section 302 is typically connected to a switching device through an electrical connection 322, which selectively connects the second section 302 to the negative or positive terminal of the power source. Preferably, the second section 302 is selectively connected to a terminal different than the first section 302 (e.g., the first section is selectively connected to a positive terminal when the second section is connected to a negative terminal and vice versa). As with the first base portion 308, the second base portions 310 is configured with a plurality of spaced apart second extensions 316 that extend transverse relative to the length of the carrier 294 and the extensions 316 are preferably skew (e.g., substantially perpendicular) to the second base portion 310. Due to the centrally located configuration of the first section 302 (e.g., between the second and third sections), the second extensions 316 are shown in an overlapping relationship with the first base portion 308.

In one configuration, the first base portion 308 and the second extensions 316 may be directly in contact with each other. However, in a preferred arrangement, the first base portion 308 and the second extensions 316 are spaced apart by a spacer 332. One example of a spacer 332 comprises a substantially electrically non-conductive or electrically insulating material located between the first base portion 308 and the second extensions 316. Though non-conductive materials available for such an application are numerous, a few examples may include glass, plastic, rubber, elastomeric or polymeric materials or otherwise and may be applied using any technique contained herein or otherwise. It is also contemplated that the material described previously for the insulative layer may also be employed.

In another example, the spacer 332 may comprise a layer of second conductive medium 326. In such a configuration, the spacer may generate heat with the application of a current traveling through the spacer (e.g., second conductive medium 326) from the first base portion 308 to the second extensions 316 or vise versa.

Advantageously, the spaced apart second extensions 316 interpose the first extensions 314 and are in an interdigitated configuration. The first and second extension are spaced apart from each other and interposed by strips of second conductive medium 326, or otherwise, which preferably overlaps at least a portion of the first and second extensions 314, 316. The second conductive medium 326 located between the first and second extensions 314, 316 form a first heat region 328. Both of the second base portions 310 are connected to a switching device, which selectively connects the second section 304 to the terminal, which is opposite in charge to the first section 302.

The third section 306 comprises a base portion 312 extending along a lengthwise edge, opposite to the second base portion 310, of the carrier 294 and is coextensive with (e.g., parallel to) the first base portion 308. Preferably, the third section 304 is connected to a switching device through an electrical connection 324, which selectively connects the third section 304 to either the negative or positive terminal of a power supply. Preferably, the third section 306 is connected to an oppositely charged terminal than that of the second section 304, although not required.

As with the first and second base portion 306, 308, the third base portion 312 is configured with a plurality of spaced apart second extensions 318 that extend transverse relative to length to the carrier 294 and preferably extend skew (e.g. perpendicular) to the third base portion 312. In the configuration depicted, the extensions extend towards the first and second base portions 308, 310 and are interposed by the first and second extensions 314, 316.

Advantageously, the spaced apart third extensions 318 interpose the first and second extensions 314, 316 and are in an interdigitated configuration. The second and third extensions 316, 318 are spaced apart from each other and interposed by strips of a second conductive medium 326, which preferably overlaps at least a portion of the second and third extensions 316, 318. The second conductive medium 326 located between the second and third extensions 316, 318 form a second heat region 330. The third base portion 312 is connected to a switching device, which selectively connects the third section 306 to the terminal, opposite in charge, to either the first section 302 or the second section 304. However, preferably the third base portion 312 is selectively connected to the terminal which is opposite in charge to the second section 304, although not required.

It should be appreciated that the patterns shown in FIGS. 8 and 9 may repeat throughout a portion of the carrier or the entire carrier. It should also be appreciated that the exemplary embodiment shown in FIGS. 8 and 9 may be configured with any of the advantages as disclosed herein. For example, any of the materials, patterns, methods, additional features or otherwise, as previously discussed in other embodiment or otherwise contained herein, may be included with the exemplary embodiments contained in FIGS. 8 and 9. Likewise, any of the features disclosed in FIGS. 8 and 9 may be wholly, or in part, included with any other embodiment or example contained herein to form the present invention.

Operation of the Heaters of FIGS. 8 and 9

Turning to a discussion of operation, referring to exemplary embodiment shown in FIG. 8, the heater 190 is illustrated having circuitry configured to enable the selection of one or more regions to be heated, to control the amount of heat output from the heater 190, or a combination thereof. As previously discussed, the heater 190 is configured with a first conductive medium 192 having at least three sections 202, 204 and 206, which are interposed by a second conductive medium 226 and selectively connected to a positive or negative terminal of a power supply. As such, any two sections of the first conductive medium 192 that are connected to oppositely charged terminals of a power supply form a circuit and thereby generates heat in the region located therebetween.

In a first mode of operation, a switching device (not shown) electrically connects the first section 202 of the first conductive medium 192 to a positive or negative terminal of a power source and connects the second section 204 to the other terminal. The connection creates a circuit for flowing electric current between the first and second sections 202, 204 through the second conductive medium 226. As discussed earlier, the application of a current through the second conductive medium 226 results in the generation of heat in the second conductive medium 226 located between the first and second sections 202, 204 thereby creating the first heated region 228. Also as discussed earlier, the amount of heat output is typically dependent upon the circuit's configuration such as dimensions (e.g. width, thickness or the like) of the conductive materials, properties (e.g., conductivity, PTC characteristics or the like) of the second conductive medium, current being applied to the second conductive medium or otherwise.

In the particular embodiment illustrated, the first heated region 228, is generally defined by the second conductive medium located between the first and second extensions 214, 216. As such, the first heated region may be considered, in the first mode of the exemplary embodiment of FIG. 8, as the area located between the upper most first extension 214 and the lower most second extension 216. However, it should be appreciated that the definition of the heated region is dependent on the flow of current through the second conductive medium 226. As such, alternate applications of second conductive medium, or the change in the direction or amount of current or otherwise, may change the location or size of the first heat region 228. For example, with the first extensions 214 extending from both sides of the first base portion 208, with interposing second extension 216, the first heated region 228 may comprise the second conductive medium 226 interposed between the first and second extensions 214, 216 on either side of the first base portion 208 or both sides. Alternatively, the first heated region 228 may be divided into two separate heat regions as so desired. As such, in this example, it is contemplated that one or both of the second base portions 210 are electrically connected to an opposite terminal of a power supply to that of the first base portion 208.

In a second mode of operation, the switching device selectively connects the first section 202 of the first conductive medium 192 to the positive or negative terminal of a power source and the third section 206 to the other terminal. This connection creates a circuit between the first and the third sections 202, 206 through the second conductive medium 226 thereby resulting in the heating of the second conductive medium 226 located there between. As such, a second heated region 234 is generated in this mode of operation.

In a more descriptive discussion of the second mode, as electric current leaves the first extensions 214, it travels through the second conductive medium 226, through the non-connected second section 204 and/or extensions thereof, through the second conductive medium 226 again, and into the third extension 218. Of course, alternate current paths are also contemplated within the scope of the present invention. For example, the second conductive medium 226 may electrically bridge the second section (e.g., through use of insulation materials). In such an embodiment, the area between the first and third extensions 214, 218 could generally defines the second heat region 234. Also, as in the first mode of operation, with the first extensions 214 extending from both sides of the first base portion 208, with adjacently located third extensions 218, the second heated region 234 may comprise the second conductive medium 226 interposed between the first and third extensions 214, 218 on either side of the first base portion 208 or both sides. Alternatively, second heated region 234 may be divided into two separate heat regions as so desired. As such it is contemplated that one or both of the third base portions 212 are selectively and electrically connected to an opposite terminal of a power supply to that of the first base portion 208.

In this second mode of operation, it is foreseeable that not only does the heat region change in location and size, but also the amount of heat being generated may vary due to the difference in area or amount of second conductive medium 226 subject to the applied current.

In a third mode of operation, the switching device selectively connects the second section 204 to the positive or negative terminal of a power source and the third section 206 to the other terminal. This creates a circuit between the second and third extensions 216, 218 through the second conductive medium 226 thereby resulting in the heating of the second conductive medium located there between. As such, the third heated region 230 is generated.

Similar to that of the first heat region 228, the second heated region is generally defined by the second conductive medium located between the second and third extensions 216, 218 and may include any extension located there between. As such, the heated region may be considered, in the third mode, as the area located between the upper most second extensions 216 and the lower most third extensions 218. However, as previously discussed, it should be appreciated that the definition of the heated region is dependent upon the flow of current through the second conductive medium 226. Again, similar to that of the first mode of operation, with the second extensions 216 extending from both of the second base portion 210, with interposed third extensions 218, the third heated region 230 may comprise the second conductive medium 226 interposed between the second and third extensions 214, 218 adjacent to either of the second base portion 210 or both base portions 210. Alternatively, second heated region 234 may be divided into two separate heat regions as so desired. As such it is contemplated that one or both of the second or third base portions 210, 212 are selectively and electrically connected to an opposite terminal of a power supply to that of the other second or third base portions 210, 212.

In the third mode of operation, the heat output will likely be similar to or the same as with the heat output of the first mode due to the similarity in spatial relationship and the amount of second conductive medium 226 located between the extensions 216, 218. However, differently configured sections and/or materials could produce variable different heat outputs.

In a fourth mode of operation, the switching device selectively connects the first and third sections 202 and 206 to the positive or negative terminal of a power source and the second section 204 to the other terminal. This creates a circuit between first and second extension 214, 216 and the second and third extensions 216, 218 through the second conductive medium 226. This mode of operation is substantially the same or similar to the simultaneous operation of first and third mode because the first and second heat regions 228, 230 are being heated at least partially at the same time. As such, the heat output, in the fourth mode, may be the sum of the output found in the first and third mode of operation (e.g., approximately double the heat output). Of course, such summation of heat outputs assumes the same levels of current crossing the second conductive medium 226 as in the first and third mode of operation. It is also contemplated that various voltage levels may be applied to offer different heat output levels.

With the selective application of the four modes of operation, as described above, it is possible to have at numerous heat output levels. For example, a lowest heat output level may comprise the second heat region 234 on one side of the first base portion 208 due to the reduced amount of second conductive medium 226 being subjected to an electrical current as compared to other heat regions (e.g., 228, 230). A higher heat output level may comprise the second heat regions 234 located on both sides of the first base portion 208. Yet a still higher heat output level may comprise the first heat region 228 or third heat region 230 as described above, or combinations thereof. It should be apparent the numerous heat output levels may be created with the three heat regions. It should also be apparent that this is but one circuit configuration of the present invention and with the addition of other configurations comes the ability to create yet more circuits and heat output levels.

Now referring to the exemplary embodiment shown in FIG. 9, the heater 190 again is illustrated having circuitry configured to enable the selection of one or more regions to be heated, the one or more amounts of heat output from the heater 190, or a combination thereof. As previously discussed, the heater 190 is configured with a first conductive medium 192 having at least three sections 202, 204 and 206, which are interposed by a second conductive medium 226 and selectively connected to a positive or negative terminal of a power supply. As such, any two sections of the first conductive medium 194 that are connected to oppositely charged terminals of a power supply can form a circuit and thereby generate heat in the region located there between.

As discussed, the heater 290 of FIG. 9 includes an overlapping relationship between its sections and the overlapping portions may include a spacer 332 located therebetween for preventing a current from shorting or traveling to an undesired location or otherwise. Though, at times, it may be desirous to electrically connect the overlapping portions of the first and second sections 302, 304 or alternatively, interpose a second conductive medium 326 there between for the generation of yet another heating region.

Typically, the spacer 332 comprises a substantially non-conductive material so that opposite currents can travel through the overlapping portions of first and second sections 302, 304 without causing a short or otherwise interfering with current flow.

In a first mode of operation, a switching device (not shown) electrically connects the first section 302 of the first conductive medium 292 to a positive or negative terminal of a power source and connects the second section 304 to the other terminal. The connection creates a circuit between the first and second extensions 302, 304 through the second conductive medium 326 and generates the first heat region 328. The first heated region is generally defined by the second conductive medium 326 located between the first and second extensions 314, 316, but may be otherwise defined.

In a second mode, the switching device selectively connects the first section 302 to the positive or negative terminal of a power source and the third section 306 to the other terminal. This connection results in the heating of the second conductive medium 326 located between the first and second extensions 314, 316 and the second and third extensions 316 and 318. Therefore, in this configuration, the heated regions 328 and 330 will produce heat as the current will travel from the first extensions 314 through the second conductive medium 326, through the non-connected second extensions 316, through the second conductive medium 326 again, and into the third extension 318.

Assuming continuity in the illustrated pattern of the heater, this mode of operation can result in heating all strips of conductive material. However, with different extension arrangements or discontinuities in the application of the second conductive medium 326, the heating of the entire carrier 294 may be less than complete.

In a third mode, the switching device selectively connects the second section 304 to the positive or negative terminal of a power source and the third section 306 to the other terminal. This connection results in the heating of the second conductive medium 326 located between the second and third sections 304, 306 thereby generating heated region 330. Assuming size and spatial similarities between the second and third extension, as compared to the the first and second extension, the amount of heat generated in this mode can be similar to that of the first mode. Of course, changes in size and spatial relationship can provide different heat outputs.

In a fourth mode, the switching device selectively connects the first and third sections 302 and 306 to the positive or negative terminal of a power source and the second section 304 to the other terminal. This configuration results in the second conductive medium 326 located between the first and second extension 314, 316 and the second and third extension 316, 318 being heated, e.g. the first and second heat regions 328, 330.

The amount of heat generated in this fourth mode may or may not be similar to that of the second mode due to the amount of second conductive medium 326 being subjected to a current, the distance between the extensions, or otherwise or combinations thereof. However, in contrast to the second operation mode, it is contemplated that the amount of current traveling through the circuit may increase due to the additional extension (e.g. second extension 314) applying a current. As such, the amount of heat output may increase or the elapsed time required to heat the heater may decrease or both.

It should be appreciated that circuitry illustrated in both FIG. 8 and FIG. 9 may comprise all or a portion of a given heating circuit. Likewise the circuits may be combined with each other or any other circuits to form the heater of the present invention.

Also, while the second conductive medium is illustrated between all of the extension, it should be appreciated that the second conductive medium may be selectively applied between the extensions thereby changing the flow of current through the sections of the heater, the second conductive medium or both.

Although the heaters illustrated include two or three sections, it is contemplated that the heaters may be configured with more than three or less than two sections, which can be selectively connected to a power supply.

Furthermore, it is contemplated that the current applied to any of the circuits contained herein may be controllably varied to achieve a desired heat output. For example, a control unit may be utilized to apply a first voltage to the heater in a first mode and apply a second voltage in a second mode, which may be higher or lower than the first voltage. As such, the application of power to the circuit may vary, which may further vary the heat output of the heater.

In these later embodiments, as exemplified through FIGS. 8 and 9, it is contemplated that any of the additional features that may be used with the heater of the present invention, as discussed with other embodiment contained herein or otherwise, may also be used in these later embodiments. As an example, additional layers may be used, which may include insulating, adhesive or protective layers. Likewise, these later embodiments may be used in any of the application as contained herein (e.g., seats, mirrors, steering wheels or otherwise).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An article of manufacture, comprising:
   a carrier of the article of manufacture, the carrier having a surface;
   a heater overlaying the surface, the heater including:
      i) a polymeric film flexible carrier having:
         a longitudinal axis;
      ii) a first conductive medium disposed upon the polymeric film flexible carrier wherein the first conductive medium includes:
         1) a negative section having:
            a. a first base portion and
            b. a plurality of first extensions extending from the first base portion; and
         2) a positive section having:
            a. a second base portion and
            b. a plurality of second extensions extending from the second base portion; and
      wherein the plurality of first extensions have substantially a same shape and are substantially uniformly spaced apart from each other, and the plurality of second extensions have a same shape and are substantially uniformly spaced apart from each other;
      iii) a second conductive medium disposed on the polymeric film flexible carrier in an overlapping relation with the plurality of first extensions and the plurality of second extensions;
      wherein the second conductive medium is a plurality of resistive strips that are each in contact with one of the plurality of first extensions and one of the plurality of second extensions; and
      wherein the plurality of resistive strips are sectioned and broken into pieces.

2. The article of manufacture as in claim 1, wherein the article of manufacture includes electrical connections and the only electrical connections of the heater are a first electrical connection and a second electrical connection.

3. The article of manufacture as in claim 1, wherein the carrier of the article of manufacture is an interior trim component.

4. The article of manufacture as in claim 1, wherein the carrier of the article of manufacture is an automotive trim component that generally comes into contact with an occupant of a vehicle.

5. The article of manufacture as in claim 1, further including an electrical connection attached to and covered by a patch.

6. The article of manufacture as in claim 1, wherein the base portion of the first conductive medium and the second conductive medium are disposed on opposite sides of the polymeric film flexible carrier.

7. The article of manufacture as in claim 6, wherein the base portion of the first conductive medium and the second conductive medium are symmetrical in shape.

8. The article of manufacture as in claim 1, wherein the carrier of the article of manufacture is an article of clothing.

9. The article of manufacture as in claim 1, wherein a width of the first base portion and the second base portion progressively narrow along the longitudinal axis of the heater.

10. The article of manufacture as in claim 9, wherein the width of the first base portion and the second base portion progressively expand along the longitudinal axis of the heater as the first base portion and the second base portion extend away from a section that progressively narrows.

11. The article of manufacture as in claim 1, wherein heater includes an insulating layer formed of fleece, or gauze and fastened to the carrier by an adhesive.

12. The article of manufacture as in claim 1, wherein the heater is integrated with an occupant sensor.

13. The article of manufacture as in claim 12, wherein the occupant sensor is a pressure sensor to determine the presence of an applied force acting on the heater or the sensor.

14. The article of manufacture as in claim 1, wherein the heater includes an occupant sensor.

15. An article of manufacture, comprising:
- a carrier of the article of manufacture, the carrier having a surface;
- a heater overlaying the surface of the carrier, the heater including:
  - ii) a polymeric film flexible carrier having:
    - a. a longitudinal axis;
    - b. a first lengthwise edge;
    - c. a second lengthwise edge on an opposite side of the longitudinal axis, the second lengthwise edge opposing the first lengthwise edge;
  - iii) a first conductive medium disposed upon the polymeric film flexible carrier wherein the first conductive medium includes:
    1) a negative section having:
       - a. a base portion and
       - b. a plurality of first extensions extending from the base portion; and
    2) a positive section having:
       - a. a base portion and
       - b. a plurality of second extensions extending from the base portion;
  - iv) a second conductive medium disposed on the polymeric film flexible carrier in an overlapping relation with the plurality of first extensions and the plurality of second extensions;
  - v) an insulating layer over the first conductive medium and the second conductive medium, the insulating layer being a film, a vinyl sheet, or a flexible sheet; and
  - vi) a sensor;

wherein the second conductive medium is a plurality of strips and the strips are sectioned and broken into pieces; and wherein the second conductive medium is a positive thermal coefficient material.

16. The article of manufacture of claim 15, wherein the heater is connected to the surface of the carrier and the carrier is a gear shifter, panel, footwell, or a floor mat, cargo or bed liner.

17. The article of manufacture of claim 16, wherein the heater is asymmetric.

18. The article of manufacture of claim 17, wherein the negative section and the positive section are located on both sides of the longitudinal axis and are symmetrical in shape.

19. The article of manufacture of claim 17, wherein the negative baser portion is partially or fully enclosed within the positive base portion.

20. The article of manufacture of claim 15, wherein the heater includes one or more electrical connections that are attached to the negative section and the positive section respectively by a rivet, and wherein the one or more electrical connections are covered by a patch.

* * * * *

UNITED STATES PATENT AND TRADEMARK OFFICE
CERTIFICATE OF CORRECTION

PATENT NO.       : 9,315,133 B2
APPLICATION NO.  : 14/310072
DATED            : April 19, 2016
INVENTOR(S)      : Shaun Calvin Howick and Goran Bajic It is certified that error appears in the above-identified patent and that said Letters Patent is hereby corrected as shown below:

In the claims,

Column 25, Claim 11, Line 3, "wherein heater" should be "wherein the heater".

Column 26, Claim 19, Line 25, "baser" should be "base".

Signed and Sealed this
Fourteenth Day of June, 2016

Michelle K. Lee
*Director of the United States Patent and Trademark Office*